United States Patent
Nonaka et al.

(10) Patent No.: US 9,525,841 B2
(45) Date of Patent: *Dec. 20, 2016

(54) IMAGING DEVICE FOR ASSOCIATING IMAGE DATA WITH SHOOTING CONDITION INFORMATION

(71) Applicant: OLYMPUS CORPORATION, Hachioji-shi, Tokyo (JP)

(72) Inventors: Osamu Nonaka, Sagamihara (JP); Eiichi Fuse, Tokorozawa (JP); Yuichi Tsuchimochi, Hachioji (JP); Takeshi Ishino, Hachioji (JP); Shinya Abe, Hachioji (JP)

(73) Assignee: OLYMPUS CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/070,100

(22) Filed: Mar. 15, 2016

(65) Prior Publication Data

US 2016/0198119 A1 Jul. 7, 2016

Related U.S. Application Data

(63) Continuation of application No. 14/555,272, filed on Nov. 26, 2014, now Pat. No. 9,317,750.

(30) Foreign Application Priority Data

Nov. 27, 2013 (JP) ................. 2013-245218

(51) Int. Cl.
H04N 5/225 (2006.01)
G10L 25/48 (2013.01)
(Continued)

(52) U.S. Cl.
CPC ............ H04N 5/77 (2013.01); G06K 9/00671 (2013.01); G10L 25/48 (2013.01); G11B 27/34 (2013.01);
(Continued)

(58) Field of Classification Search
CPC ..... G06K 9/00671; G10L 25/48; H04N 5/225; H04N 9/8211; H04N 2201/33378
(Continued)

(56) References Cited

U.S. PATENT DOCUMENTS 7,015,950 B1 * 3/2006 Pryor .................. G06F 3/017
348/207.11
2008/0002948 A1 * 1/2008 Murata ................ H04S 1/005
386/338

(Continued)

FOREIGN PATENT DOCUMENTS

JP 2005-354134 A 12/2005
JP 2010-251841 A 11/2010

Primary Examiner — Hung Lam
(74) Attorney, Agent, or Firm — Volpe and Koenig, P.C.

(57) ABSTRACT

An imaging device includes an imaging unit configured to generate image data, an image data analyzing unit configured to analyze the image data to determine an age group or a sex of an image of a person included in the image data, a voice data generating unit configured to generate voice data, a voice data analyzing unit configured to analyze the voice data, a shooting condition information generating unit configured to generate shooting condition information based on a result of an analysis by the voice data analyzing unit and the age group or the sex of the image of the person determined by the image data analyzing unit, an image data recording unit, and a recording controller configured to record the image data and the shooting condition information in the image data recording unit.

8 Claims, 19 Drawing Sheets

(51) Int. Cl.
*H04N 5/77* (2006.01)
*G06K 9/00* (2006.01)
*H04N 9/82* (2006.01)
*G11B 27/34* (2006.01)
*H04N 5/232* (2006.01)

(52) U.S. Cl.
CPC .......... *H04N 5/225* (2013.01); *H04N 5/23229* (2013.01); *H04N 9/8211* (2013.01)

(58) Field of Classification Search
USPC ................... 348/231.2, 231.3, 231.4, 425.1, 423.1,348/462, 481, 515, E7.04
See application file for complete search history.

(56) References Cited

U.S. PATENT DOCUMENTS

| | | | | |
|---|---|---|---|---|
| 2009/0273667 A1* | 11/2009 | Nozaki | ................... | H04N 5/232 348/77 |
| 2010/0231730 A1* | 9/2010 | Ichikawa | ............... | H04N 5/232 348/207.99 |
| 2011/0149108 A1* | 6/2011 | Takizawa | ................ | G10L 25/78 348/222.1 |
| 2011/0190008 A1 | 8/2011 | Eronen | | |
| 2013/0176481 A1* | 7/2013 | Holmes | ................ | H04N 5/2354 348/370 |
| 2013/0226850 A1* | 8/2013 | Hannuksela | ............ | G10L 25/48 706/14 |
| 2014/0184852 A1* | 7/2014 | Niemi | ................... | H04N 5/2356 348/239 |
| 2014/0368912 A1* | 12/2014 | Imada | ................... | G02B 27/646 359/557 |
| 2015/0314914 A1* | 11/2015 | Sudakoff | .............. | B65D 21/086 220/666 |

* cited by examiner

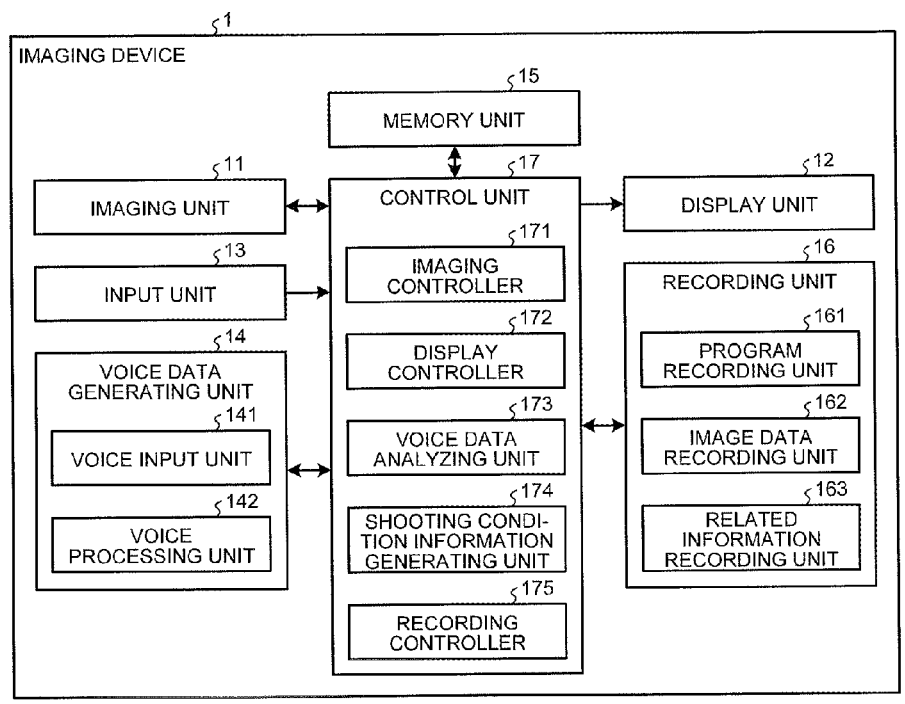

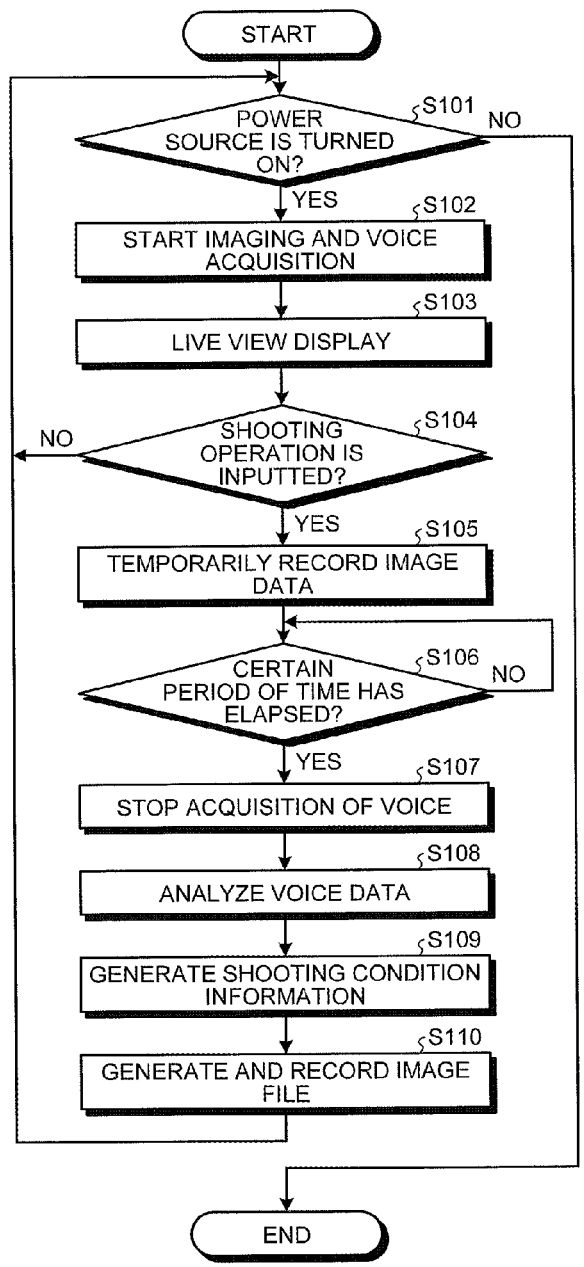

FIG.12

|  |  | AGE/SEX ANALYSIS 1 WITH VOICE (SUBJECT) | | | |
| --- | --- | --- | --- | --- | --- |
|  |  | CHILD | FEMALE (ADULT) | MALE (ADULT) | NO CANDIDATE |
| AGE/SEX ANALYSIS 2 WITH VOICE (PHOTOG- RAPHER) | CHILD | PATTERN A | PATTERN E | PATTERN E | PATTERN E |
|  | FEMALE (ADULT) | PATTERN B | PATTERN F | PATTERN F | PATTERN G |
|  | MALE (ADULT) | PATTERN C | PATTERN F | PATTERN F | PATTERN G |
|  | NO CANDIDATE | PATTERN D | PATTERN G | PATTERN G | PATTERN H |

FIG.13A

| | | AGE/SEX ANALYSIS WITH VOICE | | | |
|---|---|---|---|---|---|
| | | PATTERN A | PATTERN B | PATTERN C | PATTERN D |
| EXTRACTED KEYWORD FROM VOICE | "DAD" OR "MOM" | FAMILY PHOTO WHEN CHILD IS YOUNG (PHOTO OF CHILD SHOT BY ANOTHER CHILD) | FAMILY PHOTO WHEN CHILD IS YOUNG (PHOTO SHOT BY MOTHER) | FAMILY PHOTO WHEN CHILD IS YOUNG (PHOTO SHOT BY FARTHER) | FAMILY PHOTO WHEN CHILD IS YOUNG |
| | "TEACHER" | SCHOOL EVENT (PHOTO OF STUDENT SHOT BY ANOTHER STUDENT) | SCHOOL EVENT (PHOTO SHOT BY FEMALE TEACHER) | SCHOOL EVENT (PHOTO SHOT BY MALE TEACHER) | SCHOOL EVENT (PHOTO SHOT BY TEACHER) |

FIG.13B

| | | AGE/SEX ANALYSIS WITH VOICE | | | |
|---|---|---|---|---|---|
| | | PATTERN E | PATTERN F | PATTERN G | PATTERN H |
| EXTRACTED KEYWORD FROM VOICE | "DAD" OR "MOM" | FAMILY PHOTO WHEN CHILD IS YOUNG (PHOTO SHOT BY CHILD) | FAMILY PHOTO AFTER CHILD IS GROWN UP (PHOTO SHOT BY PARENT OR CHILD) | FAMILY PHOTO (PHOTO SHOT BY PARENT OR CHILD) | UNCLEAR |
| | "TEACHER" | SCHOOL EVENT (PHOTO OF TEACHER SHOT BY STUDENT) | SCHOOL EVENT (PHOTO SHOT BY TEACHER, OR PHOTO OF TEACHER) | SCHOOL EVENT | UNCLEAR |

FIG.16

| | AGE/SEX ANALYSIS WITH VOICE | | | |
|---|---|---|---|---|
| AGE/SEX ANALYSIS WITH IMAGE | CHILD | ONE MALE AND ONE FEMALE (ADULT) | TWO SAME SEX PERSONS (ADULT) | NO CANDIDATE |
| CHILD | PATTERN I | PATTERN M | PATTERN M | PATTERN P |
| ONE MALE AND ONE FEMALE (ADULT) | PATTERN J | PATTERN N | PATTERN M | PATTERN Q |
| TWO SAME SEX PERSONS (ADULT) | PATTERN K | PATTERN M | PATTERN O | PATTERN R |
| NO CANDIDATE | PATTERN L | PATTERN M | PATTERN M | PATTERN S |

FIG.17A

| | AGE/SEX ANALYSIS WITH VOICE AND IMAGE | | | | | |
|---|---|---|---|---|---|---|
| | PATTERN I | PATTERN J | PATTERN K | PATTERN L | PATTERN M | PATTERN N |
| SHOOTING CONDITION INFORMATION | PHOTO OF CHILD (TALKING) | PHOTO OF ONE MALE AND ONE FEMALE (SHOT BY CHILD) | PHOTO OF TWO SAME SEX PERSONS (SHOT BY CHILD) | PHOTO SHOT BY CHILD | PHOTO SHOT BY TWO CLOSE FRIENDS | HEART MARK |

FIG.17B

| | AGE/SEX ANALYSIS WITH VOICE AND IMAGE | | | | |
|---|---|---|---|---|---|
| | PATTERN O | PATTERN P | PATTERN Q | PATTERN R | PATTERN S |
| SHOOTING CONDITION INFORMATION | IN-CONVERSATION MARK | PHOTO OF CHILD | PHOTO OF ONE MALE AND ONE FEMALE | PHOTO OF TWO SAME SEX PERSONS | UNCLEAR |

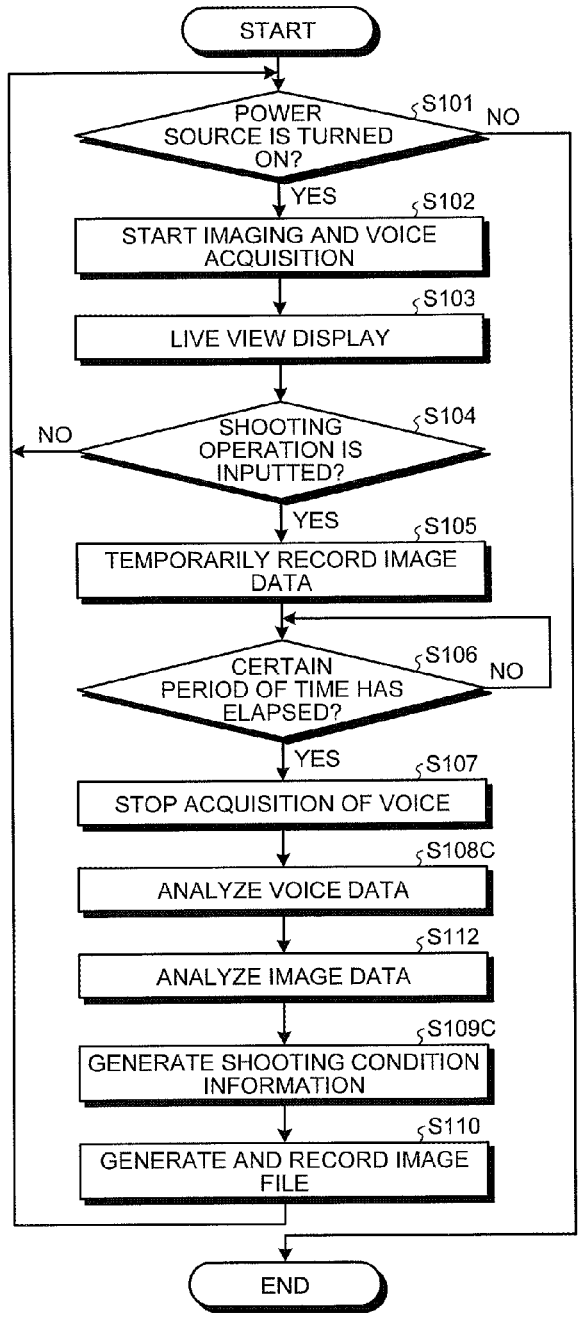

FIG.20

|  |  | AGE/SEX ANALYSIS WITH IMAGE 1 |
|---|---|---|
|  |  | CHILD |
| AGE/SEX ANALYSIS WITH IMAGE (OTHER) | CHILD | CLOSE FRIENDS |
|  | FEMALE (ADULT) | SHOT BY FATHER |
|  | MALE (ADULT) | SHOT BY MOTHER |

IMAGING DEVICE FOR ASSOCIATING IMAGE DATA WITH SHOOTING CONDITION INFORMATION

CROSS-REFERENCE TO RELATED APPLICATIONS

This application is a continuation of U.S. patent application Ser. No. 14/555,272, filed on Nov. 26, 2014, based upon and claims the benefit of priority from Japanese Patent Application No. 2013-245218, filed on Nov. 27, 2013, the entire contents of which are incorporated herein by reference.

BACKGROUND OF THE INVENTION

1. Field of the Invention

The present invention relates to an imaging device that captures a subject.

2. Description of the Related Art

In an imaging device such as a digital camera, a capacity of an image memory that records image data generated by imaging has recently been increasing.

The imaging device has a great advantage of providing an environment in which a user can capture with no concern for a memory capacity, since the number of images that can be recorded increases as described above. However, the user has to process enormous image data during playback. Specifically, some measures are required for a method of searching a desired image out of a huge number of images.

In view of this, a method has been proposed in which a search keyword inputted by a user is applied to image data upon recording this image data, and a desired image is searched based on this keyword (for example, see Japanese Unexamined Patent Publication No. 2005-354134).

SUMMARY OF THE INVENTION

In accordance with some embodiments, an imaging device is presented.

In some embodiments, an imaging device includes: an imaging unit configured to capture an image of a subject and generate image data; an image data analyzing unit configured to analyze the image data generated by the imaging unit to determine an age group or a sex of an image of a person included in the image data, a voice data generating unit configured to generate voice data based on an input voice; a voice data analyzing unit configured to analyze the voice data generated by the voice data generating unit; a shooting condition information generating unit configured to generate shooting condition information related to a shooting condition, based on a result of an analysis by the voice data analyzing unit and the age group or the sex of the image of the person determined by the image data analyzing unit; an image data recording unit configured to record therein the image data generated by the imaging unit; and a recording controller configured to associate the image data generated by the imaging unit with the shooting condition information generated by the shooting condition information generating unit and record the image data and the shooting condition information in the image data recording unit.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a block diagram illustrating a configuration of an imaging device according to a first embodiment of the present invention;

FIG. 2 is a diagram illustrating one example of related information recorded in a related information recording unit illustrated in FIG. 1;

FIG. 3 is a flowchart illustrating an operation of the imaging device illustrated in FIG. 1;

FIG. 12 is a diagram for describing related information recorded in the related information recording unit illustrated in FIG. 9;

FIG. 13A is a diagram illustrating one example of related information recorded in the related information recording unit illustrated in FIG. 9;

FIG. 13B is a diagram illustrating one example of related information recorded in the related information recording unit illustrated in FIG. 9;

FIG. 16 is a diagram for describing related information recorded in the related information recording unit illustrated in FIG. 15;

FIG. 17A is a diagram illustrating one example of related information recorded in the related information recording unit illustrated in FIG. 15;

FIG. 17B is a diagram illustrating one example of related information recorded in the related information recording unit illustrated in FIG. 15;

FIG. 18 is a flowchart illustrating the operation of the imaging device illustrated in FIG. 15;

FIG. 20 is a diagram illustrating one example of related information according to a modification of the fourth embodiment of the present invention.

DETAILED DESCRIPTION OF THE PREFERRED EMBODIMENTS

Figure 4:
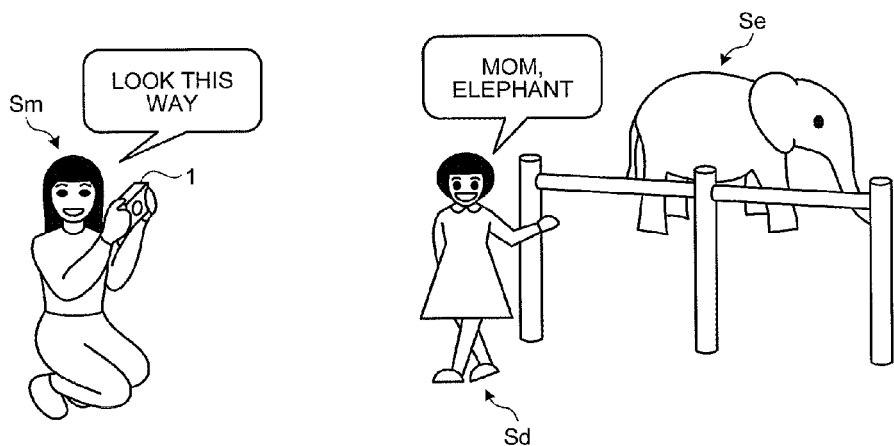
FIG. 4 is a view illustrating one example of a shooting condition.

Embodiments for embodying the present invention (hereinafter referred to as embodiments) will be described below with reference to the drawings. The present invention is not limited to the embodiments described below. The same components are identified by the same reference numerals in the description of the drawings.

First Embodiment

Schematic Configuration of Imaging Device

FIG. 1 is a block diagram illustrating a configuration of an imaging device 1 according to a first embodiment of the present invention.

The imaging device 1 is a device that captures a subject, and is an electronic device such as a digital camera, a digital video camera, or a cellular phone or a tablet portable device having a shooting function. The imaging device 1 according to the first embodiment captures a subject, and records image data generated by the imaging in association with shooting condition information related to a shooting condition upon the imaging.

An essential part of the present invention will mainly be described below as the configuration of the imaging device 1.

As illustrated in FIG. 1, the imaging device 1 includes an imaging unit 11, a display unit 12, an input unit 13, a voice data generating unit 14, a memory unit 15, a recording unit 16, and a control unit 17.

The imaging unit 11 captures a subject to generate image data under the control of the control unit 17. The imaging unit 11 includes, for example, an optical system that forms an image of the subject, an image sensor, such as a CCD (Charge Coupled Device), that receives the subject image formed by the optical system and converts the received image into an electric signal, and a signal processing unit that performs a signal process (A/D conversion) to the electric signal (analog signal) from the image sensor to generate digital image data.

The image data generated by the imaging unit 11 is sequentially stored in the memory unit 15 under the control of the control unit 17, and is recorded in the recording unit 16 according to a shooting operation to the input unit 13 by a user (photographer) of the imaging device 1.

The display unit 12 is formed by using a display panel composed of liquid crystal or organic EL (Electro Luminescence), for example. The display unit 12 displays a variety of images under the control of the control unit 17. The display unit 12 also displays operation information of the imaging device 1 and information related to shooting, as necessary, under the control of the control unit 17.

The input unit 13 includes buttons and switches receiving a user's operation, and outputs an instruction signal according to the user's operation to the control unit 17.

The input unit 13 has a function as an operation receiving unit according to the present invention.

The voice data generating unit 14 generates voice data based on an inputted voice.

As illustrated in FIG. 1, the voice data generating unit 14 includes a voice input unit 141 and a voice processing unit 142.

The voice input unit 141 includes a microphone, and converts an inputted voice into an electric signal. The microphone (voice input unit 141) may be disposed at any position such as a top surface of the imaging device 1, a surface (front surface), facing a subject, of the imaging device 1, or a surface (back surface), facing a photographer, of the imaging device 1.

The voice processing unit 142 performs A/D conversion to the electric signal converted by the voice input unit 141 with sampling and quantization to generate voice data under the control of the control unit 17.

The voice data generated by the voice data generating unit 14 is stored in the memory unit 15 under the control of the control unit 17.

The memory unit 15 stores image data generated by the imaging unit 11 or voice data generated by the voice data generating unit 14.

Specifically, the memory unit 15 has a function as a voice data storage unit according to the present invention.

As illustrated in FIG. 1, the recording unit 16 includes a program recording unit 161, an image data recording unit 162, and a related information recording unit 163.

The program recording unit 161 records various programs (including an imaging program) executed by the control unit 17, and various data pieces that are used during the execution of the programs.

The image data recording unit 162 records an image file in which shooting condition information is associated with image data generated by the imaging unit 11, under the control of the control unit 17.

FIG. 2 is a diagram illustrating one example of related information recorded in the related information recording unit 163.

The related information recording unit 163 records related information in which a specific voice (extracted keyword) and shooting condition information are associated with each other.

For example, as illustrated in FIG. 2, a "family photo" that is shooting condition information is associated with "Dad" or "Mom" that is a specific voice. A "school event" that is shooting condition information is associated with a "teacher" that is a specific voice.

The control unit 17 includes a CPU (Central Processing Unit), for example, for entirely controlling the operation of the imaging device 1 with an instruction or data transfer to each unit in the imaging device 1 according to an instruction signal from the input unit 13.

As illustrated in FIG. 1, the control unit 17 includes an imaging controller 171, a display controller 172, a voice data analyzing unit 173, a shooting condition information generating unit 174, and a recording controller 175.

The imaging controller 171 allows the imaging unit 11 to capture a subject according to a photographer's shooting operation to the input unit 13, and stores image data generated with the imaging by the imaging unit 11 into the memory unit 15 as recording image data that is to be recorded to the image data recording unit 162.

The display controller 172 controls the operation of the display unit 12 to display an image on the display unit 12.

Specifically, the display controller 172 sequentially reads the latest image data stored in the memory unit 15, and displays (live view display) the image corresponding to the image data onto the display unit 12. The display controller 172 also reads an image file matching or similar to an inputted keyword, out of image files recorded in the image data recording unit 162, according to a playback operation (including an operation of inputting a keyword upon searching an image) of "displaying an image corresponding to the recorded image data" to the input unit 13 by the user of the imaging device 1, and displays the image corresponding to this image file on the display unit 12.

The voice data analyzing unit 173 reads voice data from the memory unit 15, and analyzes the voice data while referring to related information recorded in the related information recording unit 163.

The shooting condition information generating unit 174 generates shooting condition information by referring to related information recorded in the related information recording unit 163 based on the analysis result by the voice data analyzing unit 173.

The recording controller 175 generates an image file in which the shooting condition information generated by the shooting condition information generating unit 174 is associated with the recording image data stored in the memory unit 15, and records this image file on the image data recording unit 162.

Operation of Imaging Device

Next, an operation of the imaging device 1 described above will be described.

FIG. 3 is a flowchart illustrating the operation of the imaging device 1.

When a power source of the imaging device 1 is turned on by the photographer's operation to the input unit 13 (step S101: Yes), the control unit 17 causes the imaging unit 11 to start a capture, and causes the voice processing unit 142 to operate to start an acquisition of voice (generation of voice data) (step S102: capturing step, voice data generating step). The image data generated by the imaging unit 11 is then sequentially stored in the memory unit 15.

Then, the display controller 172 reads the latest image data stored in the memory unit 15, and causes the display unit 12 to start a live view display (step S103).

Subsequently, the imaging controller 171 determines whether a shooting operation to the input unit 13 by the photographer is inputted or not (step S104).

When the imaging controller 171 determines that the shooting operation is not inputted (step S104: No), the imaging device 1 is returned to step S101.

On the other hand, when determining that the shooting operation is inputted (step S104: Yes), the imaging controller 171 causes the imaging unit 11 to capture a subject, and stores (temporarily records) image data generated by the imaging with the imaging unit 11 into the memory unit 15 as recording image data (step S105). With this, the recording image data stored in the memory unit 15 is updated to the latest recording image data.

Next, the control unit 17 always monitors whether a certain period of time has elapsed or not after the shooting operation is inputted (step S106). When a certain period of time has elapsed (step S106: Yes), the control unit 17 stops the operation of the voice processing unit 142 (stops the acquisition of voice) (step S107).

The voice data generated in steps S102 to S107 is stored in the memory unit 15. With this, the voice data stored in the memory unit 15 is updated to the latest voice data.

Subsequently, the voice data analyzing unit 173 reads the voice data stored in the memory unit 15, and analyzes the voice data (step S108: voice data analyzing step).

Specifically, the voice data analyzing unit 173 determines whether or not the voice data includes a specific voice forming the related information recorded in the related information recording unit 163 during a predetermined period including a point at which the shooting operation is executed (a point before this point by a predetermined time to a point after this point by a predetermined time).

Then, the shooting condition information generating unit 174 generates shooting condition information by referring to the related information recorded in the related information recording unit 163 based on the analysis result by the voice data analyzing unit 173 in step S108 (step S109: shooting condition information generating step).

For example, when determining that a specific voice forming the related information is included in the voice data as a result of the analysis by the voice data analyzing unit 173, the shooting condition information generating unit 174 reads (generates) shooting condition information associated with the specific voice from the related information as the shooting condition information that is to be associated with the recording image data.

On the other hand, when determining that a specific voice forming the related information is not included in the voice data as a result of the analysis by the voice data analyzing unit 173, the shooting condition information generating unit 174 generates shooting condition information indicating that a shooting condition is unclear.

Then, the recording controller 175 reads the recording image data stored in the memory unit 15 in step S105, generates an image file in which the shooting condition information generated in step S109 is associated with the recording image data, and records this image file on the image data recording unit 162 (step S110: recording control step).

Specific Examples of Shooting Condition and Image File

In order to describe in more detail the operation of the imaging device 1 described above, specific examples of a shooting condition and an image file generated by capturing a subject under the shooting condition will be described.

Figure 5:
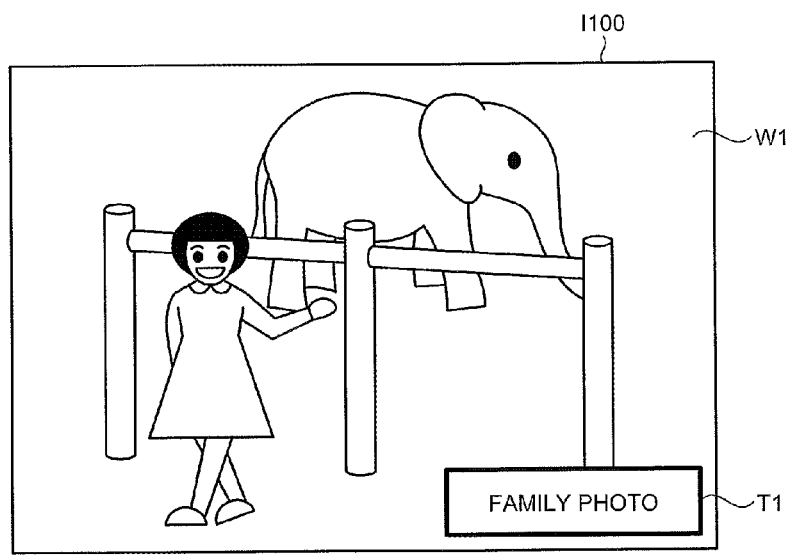
FIG. 5 is a view illustrating one example of an image corresponding to an image file generated by imaging under the shooting condition illustrated in FIG. 4.

FIG. 4 is a view illustrating one example of a shooting condition. FIG. 5 is a view illustrating one example of an image corresponding to an image file generated by the imaging under the shooting condition illustrated in FIG. 4.

It is supposed as a shooting condition that a mother Sm captures her daughter Sd as a subject with an elephant Se in the background in a zoo as illustrated in FIG. 4.

In this case, the mother Sm says to her daughter Sd, "Look this way", before starting the shooting operation to the imaging device 1 (steps S102 to S107). The daughter Sd says to her mother Sm, "Mom, elephant", during a predetermined period including a point at which the mother Sm performs the shooting operation with the imaging device 1 (steps S102 to S107).

The imaging device 1 collects the word of the daughter Sd "Mom, elephant" and the word of the mother Sm "look this way" during steps S102 to S107, and stores these words into the memory unit 15 as voice data. The imaging device 1 also analyzes the voice data to determine that the specific voice "Mom" forming the related information is included in the voice data (step S108). The imaging device 1 also reads the "family photo" associated with the specific voice "Mom" from the related information (FIG. 2) recorded in the related information recording unit 163 as the shooting condition information (step S109). The imaging device 1 generates an image file in which the "family photo" that is the shooting condition information is associated with the recording image data stored in the memory unit 15 in step S105, and records this image file in the image data recording unit 162 (step S110).

After the image file is recorded as described above, the imaging device 1 reads an image file, with which shooting condition information matching or similar to the inputted keyword (e.g., "family photo"), out of image files recorded in the image data recording unit 162, according to a playback operation to the input unit 13 by a user of the imaging device 1, and displays an image 1100 (FIG. 5) corresponding to this image file.

Specifically, as illustrated in FIG. 5, the image 1100 is an image in which character information T1 of "family photo" that is the shooting condition information is superimposed on an image W1 corresponding to the recording image data generated according to the shooting operation to the input unit 13.

The imaging device 1 described above according to the first embodiment analyzes voice data generated based on an inputted voice to generate shooting condition information related to a shooting condition based on the result of the analysis. The imaging device 1 then generates an image file in which image data generated by the imaging and the generated shooting condition information are associated with each other, and records this image file on the image data recording unit 162.

With this configuration, the user of the imaging device 1 can search a desired image out of image files recorded on the image data recording unit 162 by using the shooting condition information as a keyword. Since the shooting condition information serving as the keyword is generated based on a voice from a photographer or a subject, the user of the imaging device 1 has no need to input the shooting condition information to the imaging device 1 every time he/she performs a shooting operation.

Accordingly, the imaging device 1 according to the first embodiment provides an effect of enhancing search performance and a value upon viewing of an image without deteriorating usability.

The imaging device 1 according to the first embodiment refers to related information in which a specific voice and shooting condition information are associated with each other upon analyzing voice data and generating shooting condition information.

Therefore, upon the analysis of voice data, the imaging device 1 only determines whether or not a specific voice forming the related information is included in the voice data, and upon the generation of shooting condition information, the imaging device 1 only reads the shooting condition information associated with the specific voice in the voice data. Accordingly, a processing load of the imaging device 1 can be reduced.

The imaging device 1 according to the first embodiment also determines whether or not a specific voice is included in voice data during a predetermined period including a point at which a shooting operation is performed by a photographer.

Therefore, the imaging device 1 can generate shooting condition information matching the actual shooting condition through an analysis of voice data during a period necessary for the generation of shooting condition information. In addition, the imaging device 1 does not have to analyze the entire voice data, thereby being capable of reducing a processing load upon analyzing the voice data.

Modification of First Embodiment

The above first embodiment describes a parent-child relationship as a relationship between a photographer and a subject (FIGS. 2 and 4). However, other relationship, e.g., a male-female relationship, can be employed. In addition, this relation is not limited to popular human relationships (generally majority human relationships) described above, and this relation may be changed as necessary in consideration of a recent situation in which same-sex couples are present. A keyword determined from a voice may be based on a user's language or a dialect or custom in a district. For example, it is obvious that an imaging device 1 is optimized by specifying an image of a user (photographer or subject) and utilizing analysis data of big data. The first embodiment includes an application in which an image is specified as a pet photo (shooting condition information) from a voice of a dog or a cat. Recently, a wearable camera has been developed. To create meaning to a captured image by effectively utilizing a voice that can be detected wherever the wearable camera is set can be expected to provide a significant effect to specify a person or a pet with a wearable camera, since image data is difficult to be acquired in this situation.

In the above first embodiment, it is obvious that an application of including feeling information concerning a feeling upon shooting into the shooting condition information (recording feeling information in association with recording image data) by using a relaxed atmosphere specific to a family photo (voice has a moderate tempo, and has a feature such as a rise in pitch at the end) or a buzz specific to a school event (various excited voices are detected, a hitting voice with a desk or a chair is heard, or heavy footsteps are heard) can be implemented. An excited voice can be determined from features of many plosive voices, being single, and including only a word, or a keyword that is issued only under an excited situation. An analysis of feeling is possible from a simple word only by analyzing its intonation or rhythm.

The determination of even a feeling as described above increases an application range of the present invention, with the result that a feeling of a photographer or a subject as well as an objective condition upon shooting can be reproduced. A viewer of an image not only simply understands the image but also feels empathy for the image with emotional involvement. This is a significant motivation for viewing a photograph, and the meaning of the present invention becomes clearer by the assumption of such application.

Second Embodiment

Next, a second embodiment of the present invention will be described.

In the description below, the configurations and steps same as those in the above first embodiment are identified by the same reference numerals, and the detailed description will be skipped or simplified.

An imaging device according to the second embodiment is different from the imaging device 1 described in the above first embodiment in that the imaging device according to the second embodiment generates shooting condition information in consideration of a place where a user of the imaging device is in upon shooting as well as a result of an analysis of voice data.

Configuration of Imaging Device

Figure 6:
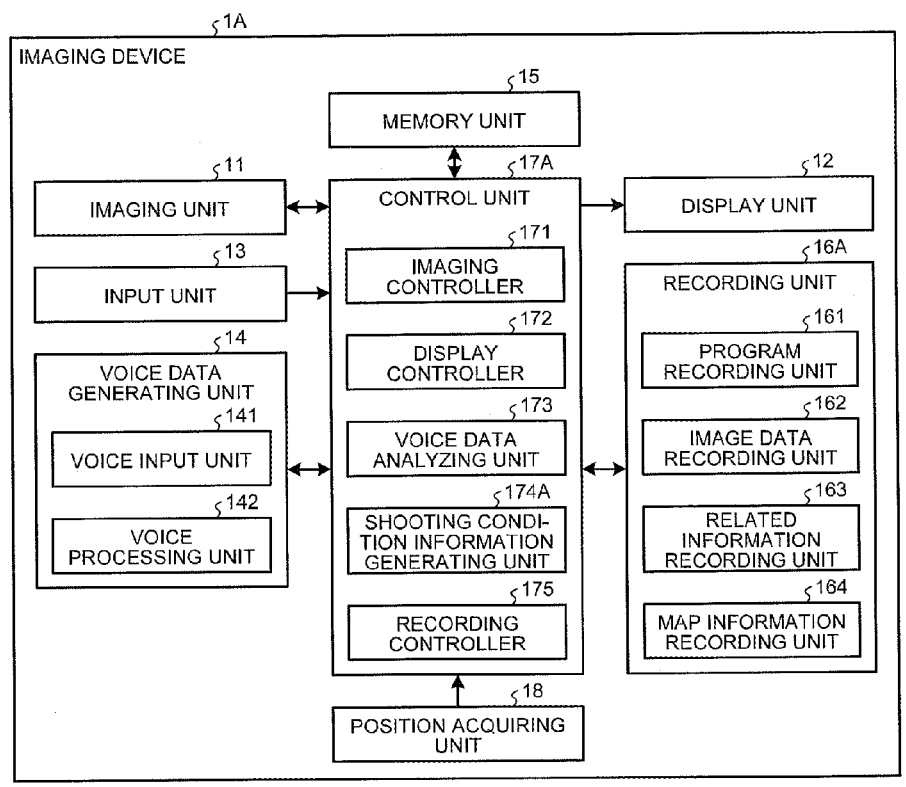
FIG. 6 is a block diagram illustrating a configuration of an imaging device according to a second embodiment of the present invention.

FIG. 6 is a block diagram illustrating a configuration of an imaging device 1A according to the second embodiment of the present invention.

As illustrated in FIG. 6, the imaging device 1A according to the second embodiment additionally includes a position acquiring unit 18 with respect to the imaging device 1 (FIG. 1) described in the first embodiment.

The position acquiring unit 18 receives satellite orbit information transmitted from plural GPS satellites, which form a GPS (Global Positioning System) serving as a measuring unit for measuring a position of an object on the ground, and acquires position information (information related to a longitude and a latitude) of the imaging device 1A based on the received orbit information. The position acquiring unit 18 then outputs the position information of the imaging device 1A to a control unit 17A.

A recording unit 16A according to the second embodiment is configured by adding a map information recording unit 164 to the recording unit 16 (FIG. 1) described in the above first embodiment.

The map information recording unit 164 records map information including a longitude and a latitude of each point.

A part of a function of a shooting condition information generating unit 174A according to the second embodiment is changed according to the additional position acquiring unit 18 and the map information recording unit 164, compared to the shooting condition information generating unit 174 described in the above first embodiment.

Operation of Imaging Device

Figure 7:
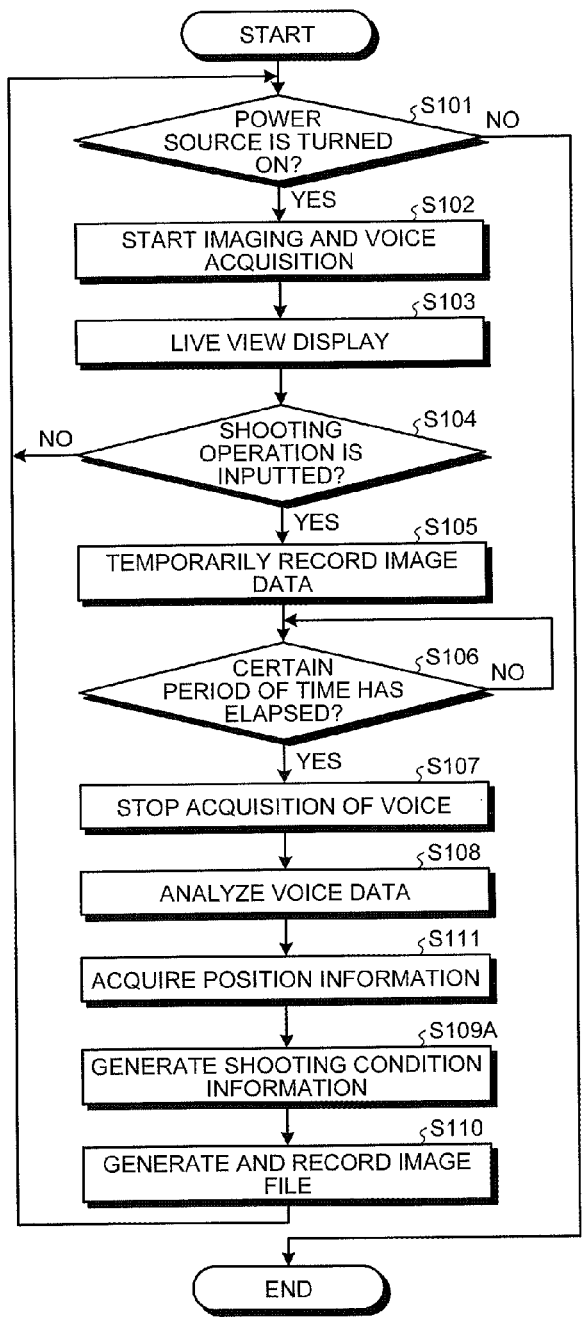
FIG. 7 is a flowchart illustrating an operation of the imaging device illustrated in FIG. 6.

FIG. 7 is a flowchart illustrating an operation of the imaging device 1A.

As illustrated in FIG. 7, the operation of the imaging device 1A according to the present second embodiment is different from the operation (FIG. 3) of the imaging device 1 described in the above first embodiment only in that step S111 is added, and step S109A (shooting condition information generating step) is executed in place of step S109.

Therefore, only steps S111 and S109A will be described below.

Step S111 is executed after step S108.

Specifically, the control unit 17A stores position information (information concerning the latitude and the longitude of the imaging device LA), which is acquired by the position acquiring unit 18 at the point at which the shooting operation is executed (step S104: Yes), into the memory unit 15 (step S111).

Then, the shooting condition information generating unit 174A generates shooting condition information based on the analysis result by the voice data analyzing unit 173 in step S108, the related information recorded in the related information recording unit 163, the position information of the imaging device 1A stored in the memory unit 15 in step S111, and the map information recorded in the map information recording unit 164 (step S109A).

Specifically, in step S109A, the shooting condition information generating unit 174A generates the shooting condition information including the place where the photographer is in upon shooting (step S104: Yes) in addition to the shooting condition information generated in step S109 described in the above first embodiment, the place being determined from the position information of the imaging device 1A and the map information recorded in the map information recording unit 164.

Specific Example of Image File

Figure 8:
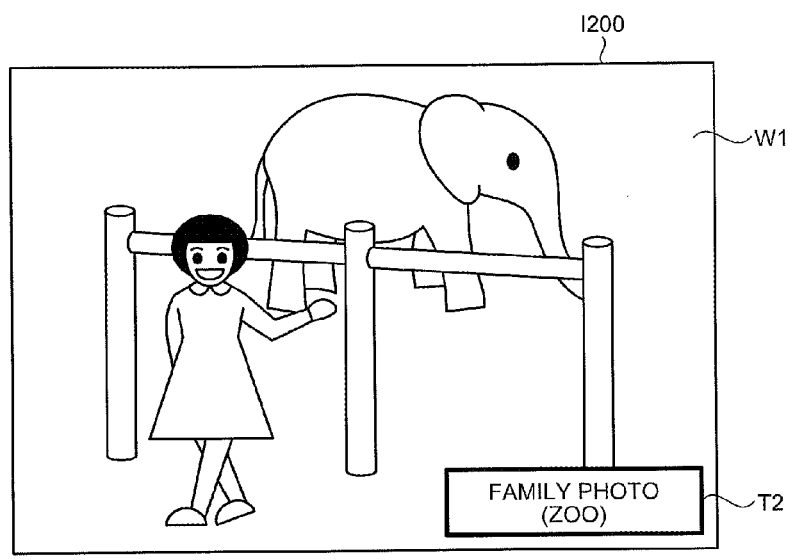
FIG. 8 is a view illustrating one example of an image corresponding to an image file generated by the operation of the imaging device illustrated in FIG. 7.

FIG. 8 is a view illustrating one example of an image corresponding to an image file generated by the operation of the imaging device 1A.

The image illustrated in FIG. 8 corresponds to the image file generated by imaging under the shooting condition illustrated in FIG. 4.

Under the shooting condition illustrated in FIG. 4, for example, the shooting condition information generating unit 174A reads the "family photo", which is associated with the specific voice "Mom" uttered from the daughter Sd, from the related information pieces (FIG. 2) recorded in the related information recording unit 163, as in the above first embodiment. The shooting condition information generating unit 174A also recognizes that the place where the photographer (mother Sm) is in is a "zoo" based on the position information of the imaging device 1A stored in the memory unit 15 in step S111 and the map information recorded in the map information recording unit 164. The shooting condition information generating unit 174A generates the read "family photo" and the recognized "zoo" as the shooting condition information (step S109A). Thereafter, the recording controller 175 generates an image file in which the "family photo" and the "zoo" that are the shooting condition information are associated with the recording image data stored in the memory unit 15 in step S105, and records this image file in the image data recording unit 162 (step S110).

As described above, after the image file is recorded, the imaging device 1A reads the image file with which the shooting condition information matching or similar to the inputted keyword (e.g., "family photo" or "zoo"), out of the image files recorded in the image data recording unit 162, according to the playback operation to the input unit 13 by the user of the imaging device 1A, and displays an image 1200 (FIG. 8) corresponding to this image file.

Specifically, the image 1200 is an image in which a character image T2 of "family photo (zoo)" that is the shooting condition information is superimposed on an image W1 corresponding to the recording image data generated according to the shooting operation to the input unit 13, as illustrated in FIG. 8.

The second embodiment described above brings the following effects in addition to the effects of the above first embodiment.

The imaging device 1A according to the second embodiment generates shooting condition information in consideration of the place where the user of the imaging device 1A is in upon shooting, as well as the analysis result of voice data.

Accordingly, the imaging device 1A can generate shooting condition information having a high likelihood of matching the actual shooting condition, and associate this shooting condition information with recording image data.

Modification of Second Embodiment

The imaging device 1A according to the second embodiment generates shooting condition information based on the analysis result of voice data and the place where the user of the imaging device 1A is in upon shooting. However, the imaging device 1A is not limited thereto. For example, the imaging device 1A may generate shooting condition information in consideration of a current date (date that is generated by the imaging unit 11 and at which recording image data is stored in the memory unit 15) provided from a real time clock (not illustrated).

For example, when the place where the mother Sm (the user of the imaging device) and the daughter Sd are in is not a zoo but an "elementary school", and the current date is "X:XX, March O" under the shooting condition illustrated in FIG. 4, the shooting condition information generating unit generates the shooting condition information as "graduation ceremony". For example, when the place where the mother Sm and the daughter Sd are in is not a zoo but a "shrine", and the current date is "X:XX, November O" under the shooting condition illustrated in FIG. 4, the shooting condition information generating unit generates the shooting condition information as "Shichi-go-san (the seven-five-three festival)".

By considering also the current date as described above, the imaging device can generate shooting condition information having more likelihood of matching the actual shooting condition, and associate this shooting condition information with recording image data.

Third Embodiment

Next, a third embodiment of the present invention will be described.

In the description below, the configurations and steps same as those in the above first embodiment are identified by the same reference numerals, and the detailed description will be skipped or simplified.

An imaging device according to the third embodiment is different from the imaging device 1 described in the above first embodiment in that the imaging device according to the third embodiment collects voices from both a photographer and a subject, and determines an age or a sex of the person uttering a voice by analyzing voice data based on the respective collected voices. The analyzing function of voice data of the imaging device according to the third embodiment is different from the analyzing function of voice data described in the first embodiment, so that related information is also different from the related information described in the first embodiment.

Configuration of Imaging Device

Figure 9:
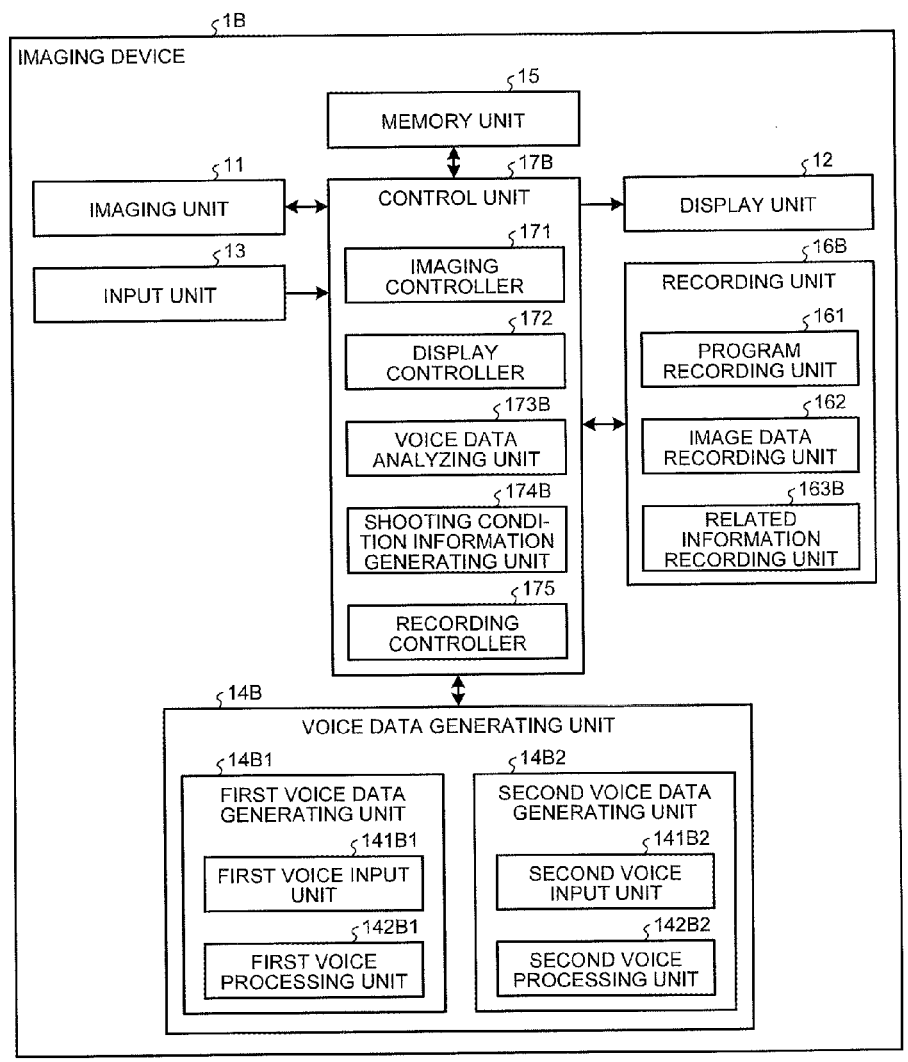
FIG. 9 is a block diagram illustrating a configuration of an imaging device according to a third embodiment of the present invention.

FIG. 9 is a block diagram illustrating an imaging device 1B according to the third embodiment of the present invention.

As illustrated in FIG. 9, the imaging device 1B according to the third embodiment employs a voice data generating unit 14B in place of the voice data generating unit 14 in the imaging device 1 (FIG. 1) described in the first embodiment.

As illustrated in FIG. 9, the voice data generating unit 14B includes a first voice data generating unit 14B1 and a second voice data generating unit 14B2.

The first voice data generating unit 14B1 includes a first voice input unit 141B1 and a first voice processing unit 142B1, each having the similar configuration and function to the voice input unit 141 and the voice processing unit 142 described in the first embodiment.

The second voice data generating unit 14B2 includes a second voice input unit 141B2 and a second voice processing unit 142B2, each having the similar configuration and function to the voice input unit 141 and the voice processing unit 142 described in the first embodiment.

The arrangement positions of the first and second voice data generating units 14B1 and 14B2 are different from the arrangement positions of the first and second voice input units 141B1 and 141B2.

The arrangement positions of the first and second voice input units 141B1 and 141B2 will be described below.

Figure 10:
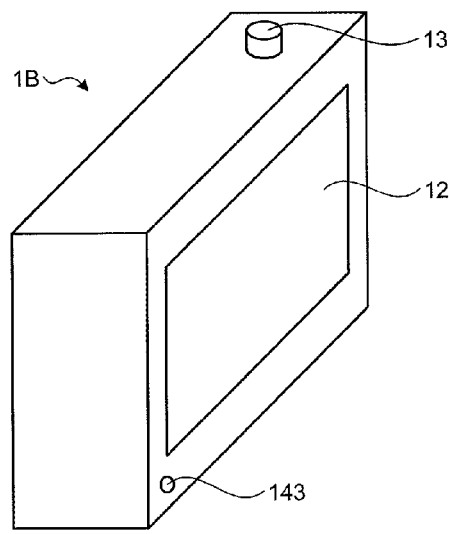
FIG. 10 is a perspective view of the imaging device in FIG. 9 viewed from a photographer.
Figure 11:
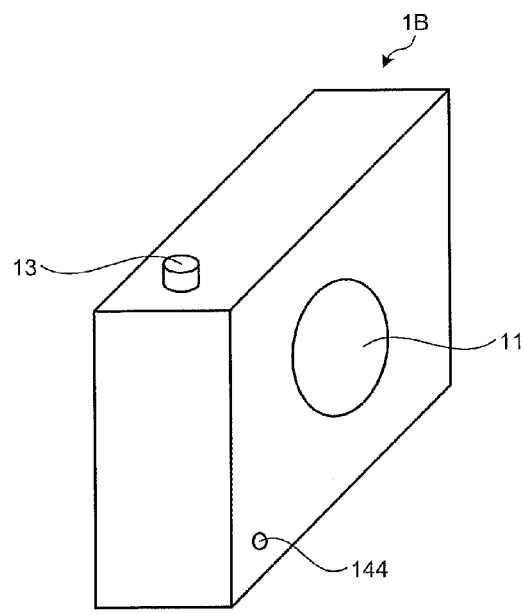
FIG. 11 is a perspective view of the imaging device in FIG. 9 viewed from a subject.

FIG. 10 is a perspective view illustrating the imaging device 1B viewed from the side (back side) facing a photographer. FIG. 11 is a perspective view illustrating the imaging device 1B viewed from the side (front side) facing a subject.

As illustrated in FIG. 10, a first microphone hole 143 that extends through an inside and outside of an outer casing for collecting a voice from a photographer is formed on the side (back side) facing the photographer of the imaging device 1B. The first voice input unit 141B1 is disposed at the position opposite to the first microphone hole 143 at the inside of the outer casing for collecting mainly a voice uttered from the photographer via the first microphone hole 143.

Similarly, as illustrated in FIG. 11, a second microphone hole 144 that extends through an inside and outside of an outer casing for collecting a voice from a subject is formed on the side (front side) facing the subject of the imaging device 1B. The second voice input unit 141B2 is disposed at the position opposite to the second microphone hole 144 at the inside of the outer casing for collecting mainly a voice uttered from the subject via the second microphone hole 144.

For the sake of convenience of description, the voice data generated by the first voice data generating unit 14B1 is described as "first voice data", and the voice data generated by the second data generating unit 14B2 is described as "second voice data".

As illustrated in FIG. 9, the imaging device 1B according to the third embodiment employs a voice data analyzing unit 173B in place of the voice data analyzing unit 173 in the imaging device 1 (FIG. 1) described in the first embodiment.

The voice data analyzing unit 173B analyzes the first and second voice data pieces generated respectively by the first and second voice data generating units 14B1 and 14B2.

The voice data analyzing unit 173B has "a function of determining whether a person uttering a voice is a photographer or a subject" and "a function of determining an age or a sex of a person uttering a voice (age/sex analysis)" as well as the function (the function of determining whether a specific voice is included or not in first and second voice data pieces) similar to the voice data analyzing unit 173 described in the above first embodiment.

The "function of determining whether a person uttering a voice is a photographer or a subject" by the voice data analyzing unit 173B is as stated below.

Specifically, before conducting the age/sex analysis of a person uttering a voice, the voice data analyzing unit 173B compares first and second voice data pieces. When a portion with the same wavelength of a voice is included in first and second voice data pieces at the same timing, the voice data analyzing unit 173B defines the portion with a higher level of an electric signal out of the portions in the first and second voice data pieces as a subject of the age/sex analysis.

For example, when a photographer utters a word, the first voice input unit 141B1 disposed at the side of the photographer collects this word (voice), and the second voice input unit 141B2 disposed at the side of a subject may also collect this word (voice). Specifically, first and second voice data pieces generated by the first and second voice data generating units 14B1 and 14B2 respectively include a portion corresponding to this word (voice). The portion included in the first and second voice data pieces has the same timing and has the same voice waveform. However, the level of the electric signal in the first voice data is higher than that in the second voice data, since the first voice input unit 141B1 is located closer to the photographer than the second voice input unit 141B2. Therefore, the voice data analyzing unit 173B does not define the portion in the second voice data as the subject of the age/sex analysis, but defines the portion in the first voice data as the subject of the age/sex analysis.

Specifically, the voice data analyzing unit 173B compares the first and second voice data pieces as described above to select the subject of the age/sex analysis, in order to determine whether the person uttering a voice is a photographer or a subject.

For example, methods (1) and (2) can be described as examples of the method of the "age/sex analysis" by the voice data analyzing unit 173B.

(1) The voice data analyzing unit 173B extracts formant from voice data (first and second voice data pieces). The voice data analyzing unit 173B then determines an age group or a sex of a person uttering a voice based on the extracted formant (see Japanese Unexamined Patent Publication No. 2007-304619, for example).

(2) The voice data analyzing unit 173B compares a sex model and an age-group model generated beforehand and a voice based on voice data (first and second voice data pieces) to calculate similarity to each model, and selects a category (sex, age group) with the highest similarity (see Japanese Unexamined Patent Publication No. 2006-285115, for example).

Examples of usable methods for determining an age group include a method of employing Gaussian mixture model (GMM) classifier with Mel-Frequency Cepstrum Coefficient (MFCC) being used as a characteristic amount, a method of using a support vector machine (SVM) with MFCC being used as a characteristic amount, a method of using a SVM classifier by using speaker-adapted GMM as a characteristic amount, a method of using a SVM classifier by using maximum likelihood linear regression (MLLR) transformation matrix as a characteristic amount, and a method of using GMM adapted to maximum a posteriori (MAP) as a characteristic amount, in addition to the methods (1) and (2).

As illustrated in FIG. 9, a recording unit 16B in the imaging device 1B according to the third embodiment employs a related information recording unit 163B that records related information different from the related information recorded in the related information recording unit 163, instead of the related information recording unit 163 described in the first embodiment.

FIG. 12 is a diagram for describing related information recorded in the related information recording unit 163B. FIGS. 13A and 13B are diagrams illustrating one example of related information recorded in the related information recording unit 163B.

The related information recording unit 163B records related information in which shooting condition information is associated with a specific voice (extracted keyword) and an age group and a sex of a person uttering a voice.

For example, age groups and sexes of a subject and a photographer, which are persons uttering a voice, are classified into patterns A to H as illustrated in FIG. 12.

Specifically, the pattern A indicates that a subject who is a "child (under age)" utters a voice, and a photographer who is a "child" utters a voice. The pattern B indicates that a subject who is a "child" utters a voice, and a photographer who is a "female (adult (of age))" utters a voice. The pattern C indicates that a subject who is a "child" utters a voice, and a photographer who is a "male (adult)" utters a voice. The pattern D indicates that a subject who is a "child" utters a voice, and a photographer utters no voice (no candidate). The pattern E indicates that a subject who is a "female (adult)" or a "male (adult)" utters a voice, or a subject utters no voice (no candidate), and a photographer who is a "child" utters a voice. The pattern F indicates that a subject who is a "female (adult)" or a "male (adult)" utters a voice, and a photographer who is a "female (adult)" or a "male (adult)" utters a voice. The pattern G indicates that a subject utters no voice (no candidate), and a photographer who is a "female (adult)" or a "male (adult)" utters a voice. The pattern G indicates that a subject who is a "female (adult)" or a "male (adult)" utters a voice, and a photographer utters no voice (no candidate). The pattern H indicates that neither a subject nor a photographer utters a voice (no candidate).

As illustrated in FIGS. 13A and 13B, in the related information according to the third embodiment, the shooting condition information associated with a specific voice is different, when the pattern described above is different even if the specific voice is "Dad" or "Mom".

Specifically, in the pattern A, a "family photo when a child is young (photo of a child shot by another child)" is associated as the shooting condition information. In the pattern B, a "family photo when a child is young (photo shot by mother)" is associated as the shooting condition information. In the pattern C, a "family photo when a child is young (photo shot by father)" is associated as the shooting condition information. In the pattern D, a "photo when a child is young" is associated as the shooting condition information. In the pattern E, a "family photo when children are young (photo of a child shot by another child)" is associated as the shooting condition information. In the pattern F, a "family photo after a child grows up (photo shot by a parent or a child)" is associated as the shooting condition information. In the pattern G, a "family photo (shot by a parent or a child)" is associated as the shooting condition information. In the pattern H, shooting condition information indicating that the shooting condition is unclear is associated.

As illustrated in FIGS. 13A and 13B, in the related information according to the third embodiment, the shooting condition information associated with a specific voice is different, when the pattern described above is different even if the specific voice is "Teacher".

Specifically, in the pattern A, a "school event (photo of a student shot by another student)" is associated as the shooting condition information. In the pattern B, a "school event (photo shot by a female teacher)" is associated as the shooting condition information. In the pattern C, a "school event (photo shot by a male teacher)" is associated as the shooting condition information. In the pattern D, a "school event (photo shot by a teacher)" is associated as the shooting condition information. In the pattern E, a "school event (photo of a teacher shot by a student)" is associated as the shooting condition information. In the pattern F, a "school event (photo shot by a teacher, or a photo of a teacher)" is associated as the shooting condition information. In the pattern G, a "school event" is associated as the shooting condition information. In the pattern H, shooting condition information indicating that the shooting condition is unclear is associated.

Specific Example of Image File

The operation of the imaging device 1B according to the third embodiment is almost similar to the operation (FIG. 3) of the imaging device 1 described in the first embodiment, so that the detailed description will not be repeated. A specific example of an image file generated by the operation of the imaging device 1B according to the third embodiment will be described below.

Figure 14:
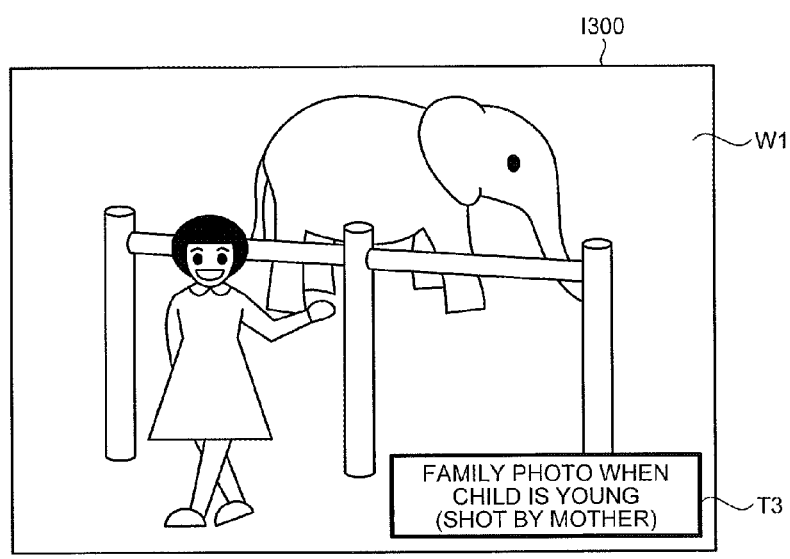
FIG. 14 is a view illustrating one example of an image corresponding to an image file generated by the operation of the imaging device illustrated in FIG. 9.

FIG. 14 is a view illustrating one example of an image corresponding to an image file generated by the operation of the imaging device 1B.

The image in FIG. 14 corresponds to an image file generated by the image capture under the shooting condition illustrated in FIG. 4.

Under the shooting condition illustrated in FIG. 4, for example, the voice data analyzing unit 173B analyzes first and second voice data pieces, which are generated by the first and second voice data generating units 14B1 and 14B2 and stored in the memory unit 15 during steps S102 to S107, as described below (step S108).

The voice data analyzing unit 173B compares first and second voice data pieces including the word "Look this way" uttered from the mother Sm, and recognizes that the person uttering this word is a photographer from a difference in levels of an electric signal of a voice part in the word "Look this way". The voice data analyzing unit 173B also analyzes first and second voice data pieces including the word "Mom, elephant" uttered from the daughter Sd, and recognizes that the person uttering this word is a subject from a difference in levels of an electric signal of a voice part in the word "Mom, elephant".

The voice data analyzing unit 173B then performs the age/sex analysis to the first voice data including the word "Look this way" uttered from the photographer (mother Sm) to recognize that the photographer is a "female (adult)". The voice data analyzing unit 173B also performs the age/sex analysis to the second voice data including the word "Mom, elephant" uttered from the subject (daughter Sd) to recognize that the subject is a "child". Specifically, the voice data analyzing unit 173B recognizes that the pattern forming the related information is the pattern B (FIG. 12) as a result of the age/sex analysis described above.

In addition, the voice data analyzing unit 173B recognizes that the first and second voice data pieces include the specific voice "Mom" forming the related information recorded in the related information recording unit 163B, as in the above first embodiment.

A shooting condition information generating unit 174B according to the third embodiment reads the "family photo when a child is young (photo shot by mother)" associated with the specific voice "Mom" and the pattern B from the related information (FIGS. 13A and 13B) recorded in the related information recording unit 163B (step S109). Thereafter, the recording controller 175 generates an image file in which the "family photo when a child is young (photo shot by mother)" is associated with the recording image data stored in the memory unit 15 in step S105, and records this image file in the image data recording unit 162 (step S110).

After the image file is recorded as described above, the imaging device 1B reads an image file with which shooting condition information matching or similar to an inputted keyword (e.g., "family photo when a child is young" or "photo shot by mother") is associated, out of the image files recorded in the image data recording unit 162, according to the playback operation to the input unit 13 by the user of the imaging device 1B, and displays an image 1300 (FIG. 14) corresponding to this image file.

Specifically, as illustrated in FIG. 14, the image 1300 is an image in which a character image T3 of "family photo when a child is young (photo shot by mother)" that is the shooting condition information is superimposed on an image W1 corresponding to the recording image data generated according to the shooting operation to the input unit 13.

The third embodiment described above brings the following effects in addition to the effects similar to those of the first embodiment.

The imaging device 1B according to the third embodiment collects voices from both a photographer and a subject, and analyzes voice data based on each of the respective collected voices. The imaging device 1B determines an age group or a sex of a person uttering the voice by analyzing the voice data.

With this, the imaging device 1B can determine whether a person uttering a voice is a photographer or a subject. Further, the imaging device 1B can generate new shooting condition information (photo shot by OO, XX photo, etc.) for specifying a photographer or a subject, and associate this shooting condition information with recording image data.

Modification of Third Embodiment

When a photographer is determined to be a "child" (the patterns A and E in FIG. 12) as a result of the analysis by the voice data analyzing unit 173B in the third embodiment, the imaging device 1B may be configured such that A control unit 17B executes an assist function for assisting the shooting by the photographer.

Examples of the assist function include an automatic zooming function to change a zooming position of an optical system, which composes the imaging unit 11, in order to allow the whole subject such as a person to fall within a viewing angle range, and a layout assist function to display a layout assist guide.

According to the execution of the assist function in the above case, even a child who is unfamiliar to the operation of the imaging device can shoot a satisfactory photograph, whereby usability can be enhanced.

In the third embodiment described above, the configurations described in the above second embodiment may be employed for the imaging device 1B to generate shooting condition information in consideration of a place where the user of the imaging device 1B is in upon shooting and the current date.

The above third embodiment illustrates related information considering majority human relationships (FIGS. 12, 13A, and 13B). However, the related information may be changed, as necessary, to meet needs of a user, considering a recent situation in which same-sex couples are present, although such situation has a low percentage. A keyword determined from the voice may be based on a user's language, a dialect in a district, or custom in a district. For example, it is obvious that a user image is specified by a user's action pattern or posting in SNS (Social Networking Service), and optimized by utilizing analysis data of big data. It is considered that a person name posted in SNS is replaced by a keyword, and its relation is analyzed to be used as reference for pattern classification. In addition, when a user keeps a certain animal as a pet, a pattern in which this pet is around the user if the imaging device catches its voice can be formed, and attaching the meaning of "photo when the pet cries" to the image ("photo when the pet cries" is associated with the recording image data as shooting condition information) is helpful for an image search or image viewing. Even if the pet is not in the photo, such information becomes significant information for viewing the image. The present embodiment also includes an application in which pet's feeling is associated with a photo from a voice of a spoiled dog or a spoiled cat. Recently, a wearable camera has been developed. To create meaning to a captured image by effectively utilizing a voice that can be detected wherever the wearable camera is set can be expected to provide a significant effect to specify a person or a pet with a wearable camera, since image data is difficult to be acquired in this situation.

It is obvious that the above third embodiment can include an application in which intonation or rhythm is determined from a word or words extracted from voice data to determine even a feeling with the database, for example, and feeling information concerning the determined feeling is included in the shooting condition information.

The determination of even a feeling as described above further increases an application range of the present invention, with the result that a feeling of a photographer or a subject as well as an objective condition upon shooting can be reproduced. A viewer of an image not only simply understands the image but also feels empathy for the image with emotional involvement. A situation in which a viewer searches a photograph for which he/she can feel empathy with emotional involvement, and he/she can relive the feeling upon shooting is a significant feature of photographic culture. In addition, a voice is not recorded as it is, but is recorded as converted into a text implying the voice, whereby search performance is dramatically enhanced. Accordingly, a feeling that is glorified but not vivid can be evoked, and restriction in playback time is not imposed.

Fourth Embodiment

Next, a fourth embodiment of the present invention will be described.

In the description below, the configurations and steps same as those in the above first embodiment are identified by the same reference numerals, and the detailed description will be skipped or simplified.

The imaging device according to the fourth embodiment is different from the imaging device 1 described in the first embodiment in that the imaging device according to the fourth embodiment generates shooting condition information based on an analysis result of recording image data in addition to an analysis result of voice data. The function of analyzing voice data in the imaging device according to the fourth embodiment is similar to the "function of determining an age group or a sex of a person uttering a voice" described in the above third embodiment.

Configuration of Imaging Device

Figure 15:
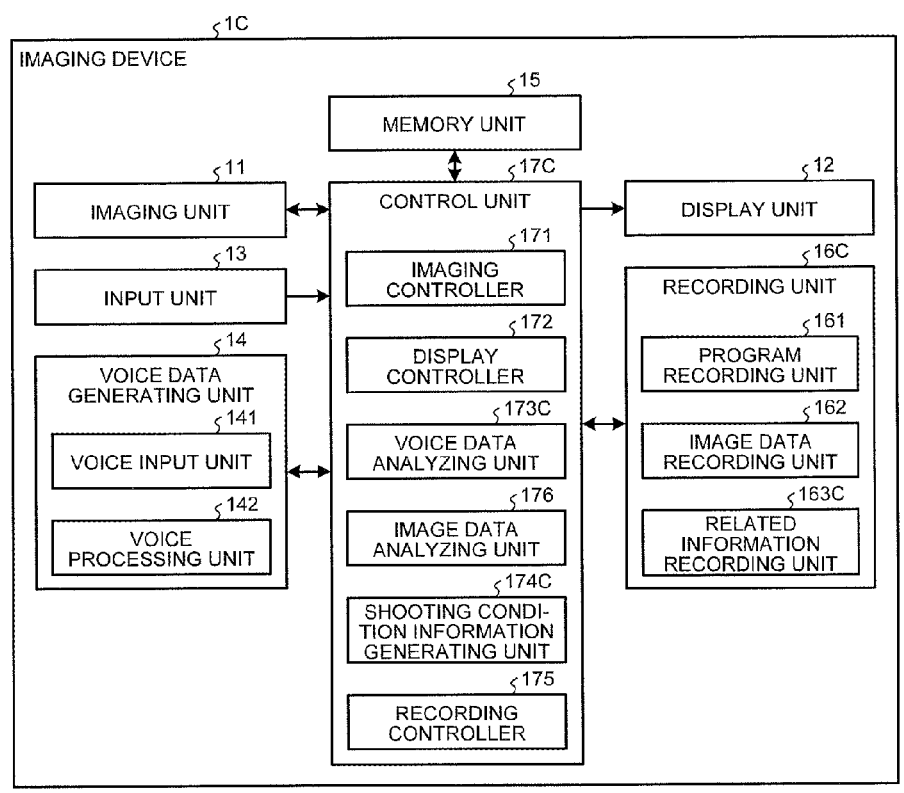
FIG. 15 is a block diagram illustrating a configuration of an imaging device according to a fourth embodiment of the present invention.

FIG. 15 is a block diagram illustrating a configuration of an imaging device 1C according to the fourth embodiment.

As illustrated in FIG. 15, a control unit 17C composing the imaging device 1C according to the fourth embodiment is formed by additionally including an image data analyzing unit 176 in the control unit 17 (FIG. 1) described in the first embodiment.

The image data analyzing unit 176 analyzes recording image data stored in the memory unit 15.

Specifically, the image data analyzing unit 176 performs a face recognition process to recording image data, and extracts feature information (shape feature information concerning a size or shape of an outline of a face, eyes, nose, and mouth, and information concerning color or brightness of face skin, i.e., contrast feature information concerning "wrinkles" or "dullness") in a region of a detected face. The image data analyzing unit 176 compares the extracted feature information and age-group models or sex models recorded beforehand in a recording unit 16C, and determines an age group or a sex of a person included in the recording image data from similarity to each model. The image data analyzing unit 176 may extract feature information in a neck region as well as the feature information of a face region, and determine an age group or a sex of a person based on the feature information pieces.

As illustrated in FIG. 15, the imaging device 1C according to the fourth embodiment employs a voice data analyzing unit 173C, instead of the voice data analyzing unit 173 in the imaging device 1 (FIG. 1) described in the above first embodiment.

The voice data analyzing unit 173C analyzes voice data stored in the memory unit 15 to perform the age/sex analysis described in the above third embodiment.

As illustrated in FIG. 15, the imaging device 1C according to the fourth embodiment employs a related information recording unit 163C, which records related information different from the related information recorded in the related information recording unit 163, instead of the related information recording unit 163 described in the above first embodiment.

FIG. 16 is a diagram for describing related information recorded in the related information recording unit 163C. FIGS. 17A and 17B are diagrams illustrating one example of related information.

The related information recording unit 163C records related information in which shooting condition information is associated with an age group, sex, and number of persons uttering a voice, and an age group, sex, and number of persons who are subjects.

For example, as illustrated in FIG. 16, age groups, sexes, and number of persons uttering a voice and persons who are subjects are classified into patterns I to S.

Specifically, the pattern I indicates that a person uttering a voice is one "child", and a person who is a subject is a "child". The pattern J indicates that a person uttering a voice is a "child", and persons who are subjects are "one male and one female (adult)". The pattern K indicates that a person uttering a voice is a "child", and persons uttering a voice are "two same sex persons (adult)". The pattern L indicates that a person uttering a voice is a "child", and a person who is a subject is not present (no candidate). The pattern M indicates that persons uttering a voice are "one male and one female (adult)", and a person who is a subject is a "child", or "two same sex persons (adult)". The pattern M also indicates that persons uttering a voice are "two same sex persons (adult)" and a person who is a subject is a "child" or "one male and one female (adult)". The pattern M also indicates that persons uttering a voice are "one male and one female (adult)" or "two same sex persons (adult)", and a person who is a subject is not present (no candidate). The pattern N indicates that persons uttering a voice are "one male and one female (adult)", and persons who are subjects are "one male and one female (adult)". The pattern O indicates that persons uttering a voice are "two same sex persons (adult)", and persons who are subjects are "two same sex persons (adult)". The pattern P indicates that a person uttering a voice is not present (no candidate), and a person who is a subject is a "child". The pattern Q indicates that a person uttering a voice is not present (no candidate), and persons who are subjects are "one male and one female (adult)". The pattern R indicates that a person uttering a voice is not present (no candidate), and persons who are subjects are "two same sex persons (adult)". The pattern S indicates that a person uttering a voice is not present (no candidate), and a person who is a subject is not present (no candidate).

As illustrated in FIGS. 17A and 17B, the related information according to the fourth embodiment is formed such that different shooting condition information is associated with each of the patterns I to S.

Specifically, a "photo of a child (talking)" is associated with the pattern I as the shooting condition information. A "photo of one male and one female (shot by a child)" is associated with the pattern J as the shooting condition information. A "photo of two same sex persons (shot by a child)" is associated with the pattern K as the shooting condition information. A "photo shot by a child" is associated with the pattern L as the shooting condition information. A "photo shot by two close friends" is associated with the pattern M as the shooting condition information. A "heart mark" is associated with the pattern N as the shooting condition information. An "in-conversation mark" is associated with the pattern O as the shooting condition information. A "photo of a child" is associated with the pattern P as the shooting condition information. A "photo of one male and one female" is associated with the pattern Q as the shooting condition information. A "photo of two same sex persons" is associated with the pattern R as the shooting condition information. Shooting condition information indicating that the shooting condition is unclear is associated with the pattern S.

In the fourth embodiment, the shooting condition information is different between the case where the age group, sex, and number of the subject are the same as the age group, sex, and number of the persons uttering a voice (patterns I, N, and O in FIG. 16) and the case where they are different (patterns J to M, and P to S in FIG. 16).

Operation of Imaging Device

FIG. 18 is a flowchart illustrating the operation of the imaging device 1C.

As illustrated in FIG. 18, the operation of the imaging device 1C according to the fourth embodiment is different from the operation (FIG. 3) of the imaging device 1 described in the above first embodiment in that step S108C (voice data analyzing step) and S109C (shooting condition generating step) are added in place of steps S108 and S109, and step S112 is added.

Therefore, only steps S108C, S112, and S109C will be described below.

In step S108C, the voice data analyzing unit 173C analyzes voice data, which is generated by the voice data generating unit 14 and stored in the memory unit 15 in steps S102 to S107, thereby conducting an age/sex analysis (including an analysis of a number of persons uttering a voice), as in the above third embodiment.

Then, in step S112, the image data analyzing unit 176 reads the recording image data stored in the memory unit 15 in step S105, and analyzes the recording image data to determine an age group, sex, and number of persons included in the recording image data.

In step S109C, A shooting condition information generating unit 174C according to the fourth embodiment reads (generates) shooting condition information associated with the analysis result by the voice data analyzing unit 173C in step S108C and the analysis result by the image data analyzing unit 176 in step S112 from the related information pieces recorded in the related information recording unit 163C.

Specific Example of Image File

Figure 19A:
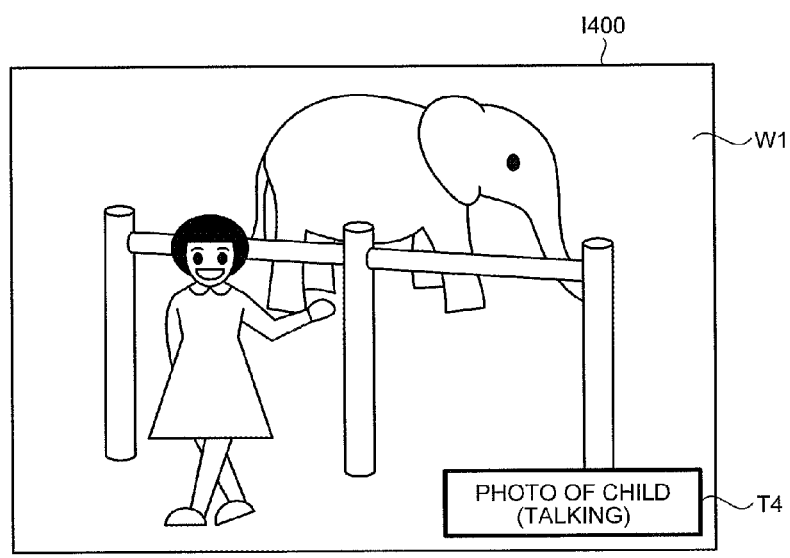
FIG. 19A is a view illustrating one example of an image corresponding to an image file generated by the operation of the imaging device illustrated in FIG. 18.
Figure 19B:
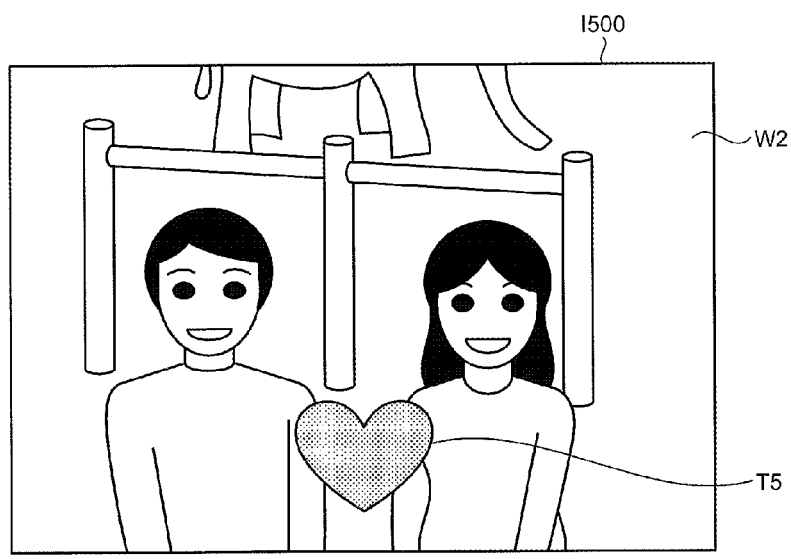
FIG. 19B is a view illustrating one example of an image corresponding to an image file generated by the operation of the imaging device illustrated in FIG. 18.
Figure 19C:
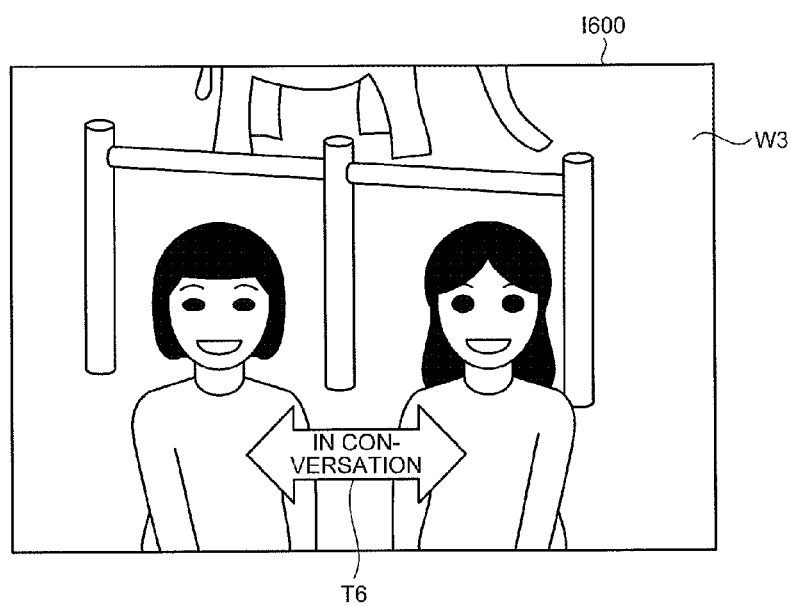
FIG. 19C is a view illustrating one example of an image corresponding to an image file generated by the operation of the imaging device illustrated in FIG. 18.

FIGS. 19A to 19C are views illustrating one example of an image corresponding to an image file generated by the operation of the imaging device 1C.

An image 1400 illustrated in FIG. 19A is an image corresponding to an image file generated by imaging under the shooting condition described below.

This shooting condition is such that a photographer (mother) captures her daughter as a subject with an elephant in the background in a zoo, like the shooting condition illustrated in FIG. 4.

In this case, the mother who is a photographer utters no word upon the shooting operation with the imaging device 1C. On the other hand, her daughter who is a subject utters some word to her mother during a predetermined period (steps S102 to S107) including the point of the shooting operation by her mother with the imaging device 1C.

In such shooting condition, the voice data analyzing unit 173C performs (step S108C) an age/sex analysis (including an analysis of a number of persons uttering a voice) for the voice data generated in steps S102 to S107 to recognize that the person uttering a voice is one "child".

The image data analyzing unit 176 analyzes the recording image data stored in the memory unit 15 in step S105 to recognize that the person, who is a subject, is one "child" (step S112).

Specifically, the pattern forming the related information is the pattern I (FIG. 16) from the analysis results of the voice data analyzing unit 173C and the image data analyzing unit 176.

The shooting condition information generating unit 174C reads the "photo of a child (talking)" associated with the pattern I from the related information pieces (FIGS. 17A and 17B) recorded in the related information recording unit 163C (step S109C). Thereafter, the recording controller 175 generates an image file in which the "photo of a child (talking)" that is the shooting condition information is associated with the recording image data stored in the memory unit 15 in step S105, and records this image file onto the image data recording unit 162 (step S110).

After the image file is recorded as described above, the imaging device 1C reads the image file with which the shooting condition information matching or similar to the inputted keyword (e.g., "photo of a child" or "talking"), out of the image files recorded in the image data recording unit 162, according to the playback operation to the input unit 13 by the user of the imaging device 1C, and displays the image 1400 (FIG. 19A) corresponding to this image file.

Specifically, the image 1400 is an image in which a character image T4 of "a photo of a child (talking)" that is the shooting condition information is superimposed on an image W1 corresponding to the recording image data generated according to the shooting operation to the input unit 13, as illustrated in FIG. 19A.

An image 1500 illustrated in FIG. 19B corresponds to an image file generated by imaging under the shooting condition described below.

This shooting condition is such that a photographer captures one male and one female (they are adults) as subjects with an elephant in the background in a zoo.

In this case, the photographer utters no word upon the shooting operation with the imaging device 1C. On the other hand, the male and the female who are subjects have a talk during a predetermined period (steps S102 to S107) including the point of the shooting operation by the photographer with the imaging device 1C.

In such shooting condition, the voice data analyzing unit 173C performs (step S108C) an age/sex analysis (including an analysis of a number of persons uttering a voice) for the voice data generated in steps S102 to S107 to recognize that the persons uttering a voice are "one male and one female (adults)".

The image data analyzing unit 176 analyzes the recording image data stored in the memory unit 15 in step S105 to recognize that the persons, who are subjects, are "one male and one female (adult)" (step S112).

Specifically, the pattern forming the related information is the pattern N (FIG. 16) from the analysis results of the voice data analyzing unit 173C and the image data analyzing unit 176.

The shooting condition information generating unit 174C reads the "heart mark" associated with the pattern N from the related information pieces (FIG. 17) recorded in the related information recording unit 163C (step S109C). Thereafter, the recording controller 175 generates an image file in which the "heart mark" that is the shooting condition information is associated with the recording image data stored in the memory unit 15 in step S105, and records this image file onto the image data recording unit 162 (step S110).

After the image file is recorded as described above, the imaging device 1C reads the image file with which the shooting condition information matching or similar to the inputted keyword (e.g., "heart mark" or "heart"), out of the image files recorded in the image data recording unit 162, according to the playback operation to the input unit 13 by the user of the imaging device 1C, and displays the image 1500 (FIG. 19B) corresponding to this image file.

Specifically, the image 1500 is an image in which a graphic image T5 of the "heart mark" that is the shooting condition information is superimposed between two persons on an image W2 corresponding to the recording image data generated according to the shooting operation to the input unit 13, as illustrated in FIG. 19B.

An image 1600 illustrated in FIG. 19C corresponds to an image file generated by imaging under the shooting condition described below.

This shooting condition is such that a photographer captures two females (they are adults) as subjects with an elephant in the background in a zoo.

In this case, the photographer utters no word upon the shooting operation with the imaging device 1C. On the other hand, the two females who are subjects have a talk during a predetermined period (steps S102 to S107) including the point of the shooting operation by the photographer with the imaging device 1C.

In such shooting condition, the voice data analyzing unit 173C performs an age/sex analysis (including an analysis of a number of persons uttering a voice) for the voice data generated in steps S102 to S107 to recognize that the persons uttering a voice are "two females (adults)" (step S108C).

The image data analyzing unit 176 analyzes the recording image data stored in the memory unit 15 in step S105 to recognize that the persons, who are subjects, are "two females (adult)" (step S112).

Specifically, the pattern forming the related information is the pattern O (FIG. 16) from the analysis results of the voice data analyzing unit 173C and the image data analyzing unit 176.

The shooting condition information generating unit 174C reads the "in-conversation mark" associated with the pattern O from the related information pieces (FIGS. 17A and 17B) recorded in the related information recording unit 163C (step S109C). Thereafter, the recording controller 175 generates an image file in which the "in-conversation mark" that is the shooting condition information is associated with the recording image data stored in the memory unit 15 in step S105, and records this image file onto the image data recording unit 162 (step S110).

After the image file is recorded as described above, the imaging device 1C reads the image file with which the shooting condition information matching or similar to the inputted keyword (e.g., "in conversation"), out of the image files recorded in the image data recording unit 162, according to the playback operation to the input unit 13 by the user of the imaging device 1C, and displays the image 1600 (FIG. 19C) corresponding to this image file.

Specifically, the image 1600 is an image in which a graphic image T6 of the "in-conversation mark" that is the shooting condition information is superimposed between two persons on an image W3 corresponding to the recording image data generated according to the shooting operation to the input unit 13, as illustrated in FIG. 19C.

The graphic image T6 is formed such that a character of "in conversation" is written in a double-headed arrow pointing each of two persons in the image W3.

The present fourth embodiment described above brings the following effects as well as the effects similar to the above first embodiment.

The imaging device 1C according to the fourth embodiment generates shooting condition information based on the analysis result of voice data and the analysis result of recording image data. The imaging device 1C determines an age group or a sex of a person uttering a voice by analyzing voice data, and determines an age group or a sex of a person, who is a subject, by analyzing recording image data.

With this, the imaging device 1C can determine whether a person uttering a voice is a photographer or a subject. Further, the imaging device 1C can generate new shooting condition information (photo shot by OO, XX photo, etc.) for specifying a photographer or a subject, and associate this shooting condition information with recording image data.

In the fourth embodiment, the shooting condition information is different between the case where the age group, sex, and number of the subject are the same as the age group, sex, and number of the persons uttering a voice (patterns I, N, and O in FIG. 16) and the case where they are different (patterns J to M, and P to S in FIG. 16).

Specifically, when the analysis result of voice data matches the analysis result of recording image data, the imaging device 1C determines that the person uttering a voice and a subject are the same, and can associate new shooting condition information ("talking", "heart mark", "in conversation", etc.) describing the condition of the subject with the recording image data.

Modification of Fourth Embodiment

FIG. 20 is a diagram illustrating one example of related information according to a modification of the fourth embodiment of the present invention.

Specifically, the related information in FIG. 20 is information in which, when subjects are two persons, and one of them is a "child", different shooting condition information is associated depending on the age group and the sex of the other one.

In the above fourth embodiment, when the recording image data includes images of plural persons, and one of them is a "child", the shooting condition information illustrated in FIG. 20 may be associated with the recording image data in steps S109C and S110, as well as the shooting condition information described in the above fourth embodiment.

Specifically, when the persons who are the subjects are determined to be two "children" as the analysis result (step S112) by the image data analyzing unit 176, the shooting condition information of "close friends" is associated with the recording image data as well as the shooting condition information described in the above fourth embodiment in steps S109C and S110.

When the persons who are the subjects are determined to be one "child" and one "female (adult)" as the analysis result by the image data analyzing unit 176 (step S112), the photographer is likely to be a father. Therefore, the shooting condition information of "photo shot by father" is associated with the recording image data as well as the shooting condition information described in the above fourth embodiment in steps S109C and S110.

When the persons who are the subjects are determined to be one "child" and one "male (adult)" as the analysis result by the image data analyzing unit 176 (step S112), the photographer is likely to be a mother. Therefore, the shooting condition information of "photo shot by mother" is associated with the recording image data as well as the shooting condition information described in the above fourth embodiment in steps S109C and S110.

In the above fourth embodiment, when the person uttering a voice is determined to be a "child" as the analysis result by the voice data analyzing unit 173C, and the subject is determined not to include a "child" as the analysis result by the image data analyzing unit 176 (in FIG. 16, the patterns J to L), the control unit 17C may execute the assist function for assisting the shooting operation by the photographer.

Specifically, the control unit 17C has a function as an assist function executing unit according to the present invention.

Examples of the assist function include an automatic zooming function to change a zooming position of an optical system, which composes the imaging unit 11, in order to allow the whole subject such as a person to fall within a viewing angle range, and a layout assist function to display a layout assist guide.

According to the execution of the assist function in the above case, even a child who is unfamiliar to the operation of the imaging device can shoot a satisfactory photo, whereby usability can be enhanced.

In the fourth embodiment described above, the configurations described in the above second embodiment may be employed for the imaging device 1C to generate shooting condition information in consideration of a place where the user of the imaging device 1C is in upon shooting and the current date.

In the fourth embodiment described above, the configuration (the configuration in which the imaging device collects voices from both a photographer and a subject, and determines whether the person uttering a voice is a photographer or a subject) described in the above third embodiment may be employed for the imaging device 1C.

The above fourth embodiment illustrates related information considering majority human relationships (FIGS. 16, 17A, and 17B). However, the related information may be changed, as necessary, to meet needs of a user, considering a recent situation in which same-sex couples are present, although such situation has a low percentage. A keyword determined from the voice may be based on a user's language, a dialect in a district, or custom in a district. For example, it is obvious that a user image is specified by a user's action pattern or posting in SNS, and optimized by utilizing analysis data of big data. It is considered that a person name posted in SNS is replaced by a keyword, and its relation is analyzed to be used as reference for pattern classification. A voice includes a sweet voice, angry voice, gruff voice, and rushing voice, and the condition indicated by the generated voice can be specified according to the pattern of the voice (accent, tempo, or pitch of the keyword). Whether the persons are "close friends" or not, or whether the "heart mark" should be attached or not can more surely be determined by utilizing such information. The present embodiment can effectively be used for much more classifications. When a crying child (this is detected from his/her crying face) is present in an image, and an angry voice is determined, the imaging device can associate the shooting condition information (feeling information) of "being scolded" with the recording image data. On the contrary, a person with an angry face is in an image, and the imaging device catches crying, the imaging device can express this situation as "angry". However, when a laughing voice is detected, the imaging device can determine this situation as "playful". In this way, the imaging device can associate more detailed shooting condition information (feeling information) with recording image data. The association of emotions with recording image data as shooting condition information as described above is helpful for an image search or image viewing. The emotions can be determined from an arrangement or angle of parts of a face composing a face image in an image, and also determined from the voice patterns described above or a specific rhythm or a change in a pitch included in "laughing voice" or "crying voice". As for the analysis of image data, a pose of a subject as well as an expression of a face described above may be analyzed. A person may take a specific pose with a specific feeling. Therefore, when it is determined that a person takes a specific pose, specific feeling corresponding to this specific pose may be associated with recording image data as shooting condition information. In addition, when a user keeps a certain animal as a pet, a pattern in which this pet is around the user if the imaging device catches its voice can be formed, and attaching the meaning of "photo when the pet cries" to the image is helpful for an image search or image viewing. Even if the pet is not in the photo, such information becomes significant information for viewing the image. The present embodiment also includes an application in which pet's feeling is associated with a photo from a voice of a spoiled dog or a spoiled cat. Recently, a wearable camera has been developed. To create meaning to a captured image by effectively utilizing a voice that can be detected wherever the wearable camera is set can be expected to provide a significant effect to specify a person or a pet with a wearable camera, since image data is difficult to be acquired in this situation.

Fifth Embodiment

A fifth embodiment of the present invention will be described next.

In the description below, the configurations and steps same as those in the above first embodiment are identified by the same reference numerals, and the detailed description will be skipped or simplified.

The present fifth embodiment is configured to include the functions of the voice data analyzing unit 173 and the shooting condition information generating unit 174 described in the first embodiment to an SNS server that is accessible via a network.

Configuration of Imaging Device

Figure 21:
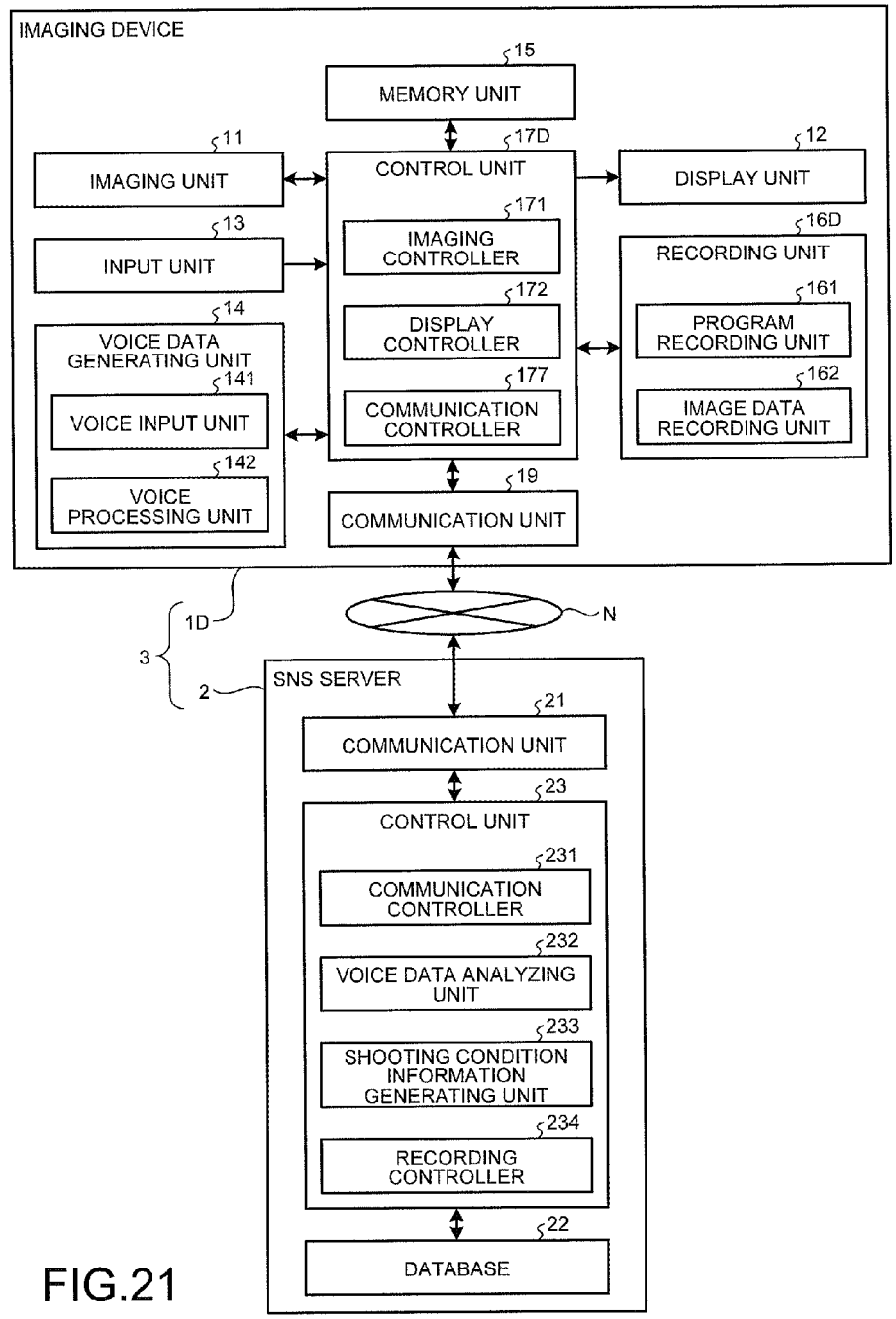
FIG. 21 is a block diagram illustrating a configuration of an imaging system according to a fifth embodiment of the present invention.

FIG. 21 is a block diagram illustrating a configuration of an imaging system 3 according to the fifth embodiment.

The imaging system 3 includes an imaging device 1D and an SNS server 2 that bi-directionally communicate via a network N as illustrated in FIG. 21.

As illustrated in FIG. 21, the imaging device 1D according to the fifth embodiment additionally includes a communication unit 19 with respect to the imaging device 1 (FIG. 1) described in the above first embodiment.

The communication unit 19 performs radio communication with the SNS server 2 via the network N according to a predetermined radio communication standard.

The communication unit 19 has a function as a transmission unit according to the present invention.

As illustrated in FIG. 21, a control unit 17D in the imaging device 1D according to the fifth embodiment is configured by eliminating the voice data analyzing unit 173, the shooting condition information generating unit 174, and the recording controller 175 from the control unit 17 (FIG.

1) described in the first embodiment and adding a communication controller 177 to the control unit 17.

The communication controller 177 controls the operation of the communication unit 19 to transmit image data and voice data to the designated SNS server 2 via the network N by referring to connection destination information (information (IP address, for example) necessary for performing radio communication with the SNS server 2 via the network N) recorded in a recording unit 16D.

Specifically, the communication controller 177 transmits voice data generated and stored in the memory unit 15 in steps S102 to S107 and recording image data stored in the memory unit 15 in step S105 to the SNS server 2 after step S107 described in the above first embodiment.

The communication controller 177 controls the operation of the communication unit 19 according to an access operation (including an operation of inputting a keyword for searching an image) for an access to the SNS server 2 to the input unit 13 by the user of the imaging device 1D, and transmits an access signal (including the inputted keyword) to the designated SNS server 2 via the network N by referring to the connection destination information recorded in the recording unit 16D.

As illustrated in FIG. 21, the recording unit 16D in the imaging device 1D according to the fifth embodiment is configured by eliminating the related information recording unit 163 from the recording unit 16 (FIG. 1) described in the above first embodiment.

As illustrated in FIG. 21, the SNS server 2 includes a communication unit 21, a database 22, and a control unit 23.

The communication unit 21 performs radio communication with the imaging device 1D or a portable device (not illustrated) such as a cellular phone via the network N according to a predetermined radio communication standard.

The communication unit 21 has a function as a receiving unit according to the present invention.

The database 22 records an image file generated by the control unit 23, and records related information described in the above first embodiment.

Specifically, the database 22 has a function as an image data recording unit according to the present invention.

As illustrated in FIG. 21, the control unit 23 includes a communication controller 231, a voice data analyzing unit 232, a shooting condition information generating unit 233, and a recording controller 234.

The communication controller 231 controls the operation of the communication unit 21 according to an access signal (including an operation of inputting a keyword for searching an image) transmitted from the imaging device 1D or a portable device via the network N to establish communication with the imaging device 1D or the portable device. The communication controller 231 also controls a display manner of a designated page of a designated browser according to the access signal to display an image, which corresponds to an image file with which shooting condition information matching or similar to the keyword included in the access signal is associated, on a display unit of the imaging device 1D or the portable device.

The voice data analyzing unit 232 performs the analysis similar to the voice data analyzing unit 173 described in the above first embodiment to the voice data received from the imaging device 1D via the communication unit 21.

The shooting condition information generating unit 233 generates shooting condition information, as in the shooting condition information generating unit 174 described in the above first embodiment, by referring to the related information pieces recorded in the database 22 based on the analysis result of the voice data analyzing unit 232.

The recording controller 234 generates the image file in which the shooting condition information generated by the shooting condition information generating unit 233 is associated with the recording image data received from the imaging device 1D via the communication unit 21, and records this image file on the database 22.

The effects similar to the above first embodiment can be provided even in the case where the SNS server 2 has the functions of the voice data analyzing unit 173 and the shooting condition information generating unit 174, as in the fifth embodiment described above.

Modification of Fifth Embodiment

In the fifth embodiment described above, the configurations described in the above second embodiment may be employed for the imaging device 1D. Specifically, information concerning a place where the user of the imaging device 1D is in upon shooting or the current date upon shooting may be transmitted to the SNS server 2 in image data and voice data. In this case, the SNS server 2 generates shooting condition information in consideration of a place where the user of the imaging device 1D is in upon shooting and the current date upon shooting.

In the fifth embodiment described above, the function of analyzing voice data (age/sex analysis) or the function of analyzing image data, which are described in the above third embodiment or fourth embodiment, may be additionally applied to the SNS server 2. Specifically, the imaging device 1D may generate shooting condition information based on the analysis result of the voice data or the analysis result of the image data.

Other Embodiments

While embodiments for embodying the present invention have been described above, the present invention should not be limited by the above first to fifth embodiments.

In the above first to fifth embodiments, shooting condition information is associated with recording image data that is a still image. However, the present invention is not limited thereto. When a moving image is captured, shooting condition information may be associated with the generated moving-image file.

In the above first to fifth embodiments, when voice data includes honorific "chan", for example, an extracted keyword including the honorific "chan" may be used as shooting condition information.

For example, under the shooting condition illustrated in FIG. 4, the mother Sm says "OO-chan, look this way", the word "OO-chan" is used as the shooting condition information. The "chan" is used on the assumption that the language is Japanese. However, it is obvious that the corresponding word can be changed according to the other languages or dialects based on a sales area, user setting, or profile information.

In the above first to fifth embodiments, image data may be analyzed, and from the analysis of the image data, whether a person is young, old, male, or female (age/sex analysis) may be determined from a face in the image data, an expression of the face may be analyzed, or a pose of a subject may be analyzed. A feeling that can be determined from the analysis of image data is effectively used, and not only a specific word in voice data is detected but also intonation or rhythm is determined from the word or words, whereby even a feeling can be determined from the database, for example. This can obviously increase an application range of the present invention. Accordingly, a feeling of a photographer or a subject as well as an objective condition upon shooting can be reproduced, whereby a viewer of an image not only simply understands the image but also feels empathy for the image with emotional involvement. A situation in which a viewer searches a photograph for which he/she can feel empathy with emotional involvement, and he/she can relive the feeling upon shooting is significant needs and feature of photographic culture. For example, "pleasant memory", "bitter memory", or "sad days" can be more intuitive than the search using words of "when", "who", or "where". When a camera becomes wearable or is used as lifelog, the search described above may be more appropriate and user friendly.

The tables illustrated in each embodiment can be rewritten, as necessary, since words or expressions are changed depending on transition of time or any areas. This may be achieved by referring to big data from profile information of a user, or may be processed through various networks or the Internet.

In the present invention, a voice is not recorded as it is, but is converted into a text indicating this voice and then recorded. With this, search performance is dramatically enhanced, resulting in that a feeling that is glorified but not vivid can be evoked, and restriction in playback time is not imposed.

The order of the processes is not limited to the order in the flowchart described in the above first to fifth embodiments, and may be changed within a consistent range.

The algorithm of the processes described by using the flowchart in the present specification can be written as a program. Such program may be recorded in a recording unit in a computer, or may be recorded on a computer-readable recording medium. The program may be recorded on a recording unit or a recording medium when a computer or the recording medium is shipped as a product, or it may be recorded on a recording unit or a recording medium by being downloaded via a communication network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
    an imager configured to capture an image of a subject and generate image data;
    a voice data generating processor configured to generate voice data based on an input voice;
    a voice data analyzing processor configured to analyze the voice data generated by the voice data generating processor;
    a shooting condition information generating processor configured to generate shooting condition information related to a shooting condition, based on a result of an analysis by the voice data analyzing processor;
    an image data recorder configured to record therein the image data generated by the imager; and
    a controller configured to associate the image data generated by the imager with the shooting condition information generated by the shooting condition information generating processor.

2. The imaging device according to claim 1, wherein the voice data analyzing processor is configured to analyze the voice data generated based on a voice from a photographer or a subject.

3. The imaging device according to claim 1, wherein the voice data analyzing processor is configured to analyze the voice data generated based on an ambient sound around the imaging device upon shooting and a voice from a photographer or a subject.

4. The imaging device according to claim 1, wherein the voice data analyzing processor is configured to analyze the voice data generated based on a conversation between a photographer and a subject.

5. The imaging device according to claim 1, further comprising
    an image data analyzer configured to analyze the image data generated by the imager to determine an age group or sex of an image of a person included in the image data, wherein
    the voice data analyzing processor is configured to analyze the voice data to determine an age group or a sex of a person uttering the voice, and
    the shooting condition information generator is configured to generate different shooting condition information depending on whether or not the age group or the sex of the image of the person determined by the image data analyzer matches the age group or the sex of the person determined by the voice analyzer.

6. The imaging device according to claim 1, further comprising:
    an image data analyzer configured to analyze the image data generated by the imager to determine an age group of an image of a person included in the image data; and
    an assist function executer configured to execute an assist function for assisting a shooting operation by a photographer, wherein
    the voice data analyzing processor is configured to analyze the voice data to determine an age group of a person uttering the voice, and
    the assist function executer is configured to execute the assist function, when the age group of the person determined by the voice data analyzing processor is less than a specified age, and the image data analyzer determines that an image of a person with an age group equal to or more than the specified age is not included in the image data.

7. The imaging device according to claim 1, further comprising
    an image data analyzer configured to analyze the image data generated by the imager to determine a sex of an image of a person included in the image data, wherein
    the shooting condition information generator is configured to generate the shooting condition information based on the result of the analysis by the voice data analyzing processor and the sex of the image of the person determined by the image data analyzer.

8. The imaging device according to claim 1, further comprising
    an image data analyzer configured to analyze the image data generated by the imager to determine a sex of an image of a person included in the image data, wherein
    the voice data analyzing processor is configured to analyze the voice data to determine a sex of a person uttering the voice, and
    the shooting condition information generator is configured to generate different shooting condition information depending on whether or not the sex of the image of the person determined by the image data analyzer matches the sex of the person determined by the voice data analyzer.

\* \* \* \* \*